US010460262B2

(12) United States Patent
McDonald

(10) Patent No.: US 10,460,262 B2
(45) Date of Patent: Oct. 29, 2019

(54) COMPUTER-IMPLEMENTED SYSTEM AND METHODS FOR DISTRIBUTION, VERIFICATION, AND REDEMPTION OF ELECTRONIC TICKETS

(71) Applicant: Scott William McDonald, Boynton Beach, FL (US)

(72) Inventor: Scott William McDonald, Boynton Beach, FL (US)

(*) Notice: Subject to any disclaimer, the term of this patent is extended or adjusted under 35 U.S.C. 154(b) by 381 days.

(21) Appl. No.: 15/409,086

(22) Filed: Jan. 18, 2017

(65) Prior Publication Data

US 2017/0206474 A1    Jul. 20, 2017

Related U.S. Application Data

(60) Provisional application No. 62/280,711, filed on Jan. 20, 2016.

(51) Int. Cl.
*G06Q 10/02* (2012.01)
*G07B 11/03* (2006.01)

(52) U.S. Cl.
CPC ............. *G06Q 10/02* (2013.01); *G07B 11/03* (2013.01)

(58) Field of Classification Search
CPC ...... G06Q 10/02; G06Q 10/087; G07B 11/03; G07B 15/00
USPC ............... 705/5, 26.1, 7.25, 14.74; 455/410; 709/226
See application file for complete search history.

(56) References Cited

U.S. PATENT DOCUMENTS

| | | | |
|---|---|---|---|
| 6,910,628 B1* | 6/2005 | Sehr ................. | G06Q 10/02 235/384 |
| 9,563,863 B2* | 2/2017 | Nielsen ............. | G06Q 10/06 |
| 2008/0255890 A1* | 10/2008 | Hilliard ............ | G06Q 10/02 705/5 |
| 2013/0346170 A1* | 12/2013 | Epstein ............. | G06Q 30/02 705/14.14 |
| 2015/0012305 A1* | 1/2015 | Truskovsky ....... | G06Q 10/02 705/5 |
| 2015/0244725 A1* | 8/2015 | Ziskind ............. | H04L 63/101 726/28 |
| 2017/0055157 A1* | 2/2017 | Bergdale .......... | H04W 12/08 |
| 2018/0225650 A1* | 8/2018 | Vossoughi ........ | G06Q 30/02 |

* cited by examiner

*Primary Examiner* — Vanel Frenel
(74) *Attorney, Agent, or Firm* — Patentfile, LLC; Bradley C. Fach; Steven R. Kick

(57) ABSTRACT

In some embodiments, an electronic ticket verification system may include a beacon device having a radio that is configured to broadcast a beacon address to a mobile device having a screen display, a radio, a processor, and an electronic ticket stored within a data store. The electronic ticket may include graphical depictions of the electronic ticket in locked, redeemable, and redeemed states, and a ticket beacon address. The processor of the mobile device may display the graphical depiction of the electronic ticket in the redeemable state when the radio of the mobile device receives the broadcasted beacon address from the beacon device that matches the ticket beacon address, and the processor may change the electronic ticket from the redeemable state to the redeemed state by no longer receiving the matching broadcasted beacon address or response to input received through the touch screen display of the mobile device.

18 Claims, 32 Drawing Sheets

COMPUTER-IMPLEMENTED SYSTEM AND METHODS FOR DISTRIBUTION, VERIFICATION, AND REDEMPTION OF ELECTRONIC TICKETS

CROSS REFERENCE TO RELATED APPLICATIONS

This application claims priority to and the benefit of the filing date of U.S. Provisional Application No. 62/280,711, filed on Jan. 20, 2016, entitled "Method and System for Distribution of Electronic Tickets with Offline Verification and Redemption Based on Proximity, Time, and Visual Display", which is hereby incorporated by reference in its entirety.

FIELD OF THE INVENTION

This patent specification relates to the field of systems and methods for distributing and redeeming electronic tickets. More specifically, this patent specification relates to systems and methods for distributing and redemption of electronic tickets in which the redemption does not require a connection to the internet.

BACKGROUND

Any business that uses paper tickets for redemption of products or services has a need to use electronic tickets to streamline the verification and redemption process before allowing customers access to the respective product or service. Businesses such as movie theaters, amusement parks, and transportation services can distribute electronic tickets but the verification and redemption of electronic tickets by a human or machine can be error-prone and arduous.

One example of prior art, an electronic ticket is displayed with a barcode on a mobile device where the mobile device is scanned by a barcode scanner for verification purposes. The problem with this system is that the scanning process is often times met with error causing the need for manual verification of the ticket causing frustration for the ticket handler and customer. Barcode scanners were not designed to read electronic screens from mobile devices as the reflection from the screen will cause the scanner to fail intermittently.

In another example of prior art, an electronic ticket is distributed to a mobile device and when it comes time for verification with a ticket handler the mobile device must have Internet connectivity (online) to call a server for authentication purposes that will allow the mobile device to present a visual display that will facilitate visual verification with the ticket handler for redemption purposes. The problem with this system is the reliance at the crucial moment of electronic ticket verification and redemption of the customer's mobile device being able to communicate with the external server or the availability of the server to be called by the mobile device—mobile device Internet communication is not reliable at best.

Therefore, there is a need for an electronic ticketing system where the customer's mobile device will receive an electronic ticket and will only present a visual verifiable display of the ticket for verification purposes when the mobile device is within physical proximity of the respective place of business at the correct scheduled time window and without ever needing to communicate with any external server because all needed processing occurs within the mobile device itself at the time of verification and redemption (offline). Once the electronic ticket is visually verified, redemption of the electronic ticket can range from the mobile device moving out of proximity, the manual redemption by the human ticket taker or customer on the mobile phone via a physical gesture on the mobile device such as a simple swipe to a complex swipe pattern, or automated redemption by placing the mobile device within proximity of a secondary proximity device at the respective place of business. Overall, the customer mobile device does not need to communicate with any external servers during this process (offline) for a fluid, expedient, and pleasant experience for the customer, ticket handler, and place of business.

BRIEF SUMMARY OF THE INVENTION

According to one embodiment consistent with the principles of the invention, a computer-implemented electronic ticket verification system is provided. In some embodiments, the system may include a beacon device having a radio that is configured to broadcast a beacon address to a mobile device having a screen display (such as a touch screen display), a data store, a processor, and a radio. An electronic ticket may be stored within the data store of the mobile device. The electronic ticket may include a graphical depiction of the electronic ticket in a locked state, a graphical depiction of the electronic ticket in a redeemable state, a graphical depiction of the electronic ticket in a redeemed state, and a ticket beacon address. The processor of the mobile device may display the graphical depiction of the electronic ticket in the redeemable state when the radio of the mobile device receives the broadcasted beacon address from the beacon device that matches the ticket beacon address, and the processor may change the electronic ticket from the redeemable state to the redeemed state in response to input received through the touch screen display of the mobile device. Optionally, the electronic ticket may transition to the redeemed state if the mobile device goes out-of-proximity.

According to another embodiment consistent with the principles of the invention, another computer-implemented electronic ticket verification system is provided. In some embodiments, the system may include a first beacon device having a radio that is configured to broadcast a first beacon address and a second beacon device having a radio that is configured to broadcast a second beacon address. A mobile device having a screen display, a data store, a processor, and a radio may be configured to receive the broadcasted first beacon address and second beacon address. An electronic ticket may be stored within the data store of the mobile device. The electronic ticket may include a graphical depiction of the electronic ticket in a locked state, a graphical depiction of the electronic ticket in a redeemable state, a graphical depiction of the electronic ticket in a redeemed state, a first ticket beacon address, and a second ticket beacon address. The processor of the mobile device may be configured to display the graphical depiction of the electronic ticket in the redeemable state when the radio of the mobile device receives the broadcasted first beacon address from the first beacon device that matches the first ticket beacon address, and the processor of the mobile device may be configured to display the graphical depiction of the electronic ticket in the redeemed state when the radio of the mobile device receives the broadcasted second beacon address from the second beacon device that matches the first ticket beacon address.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
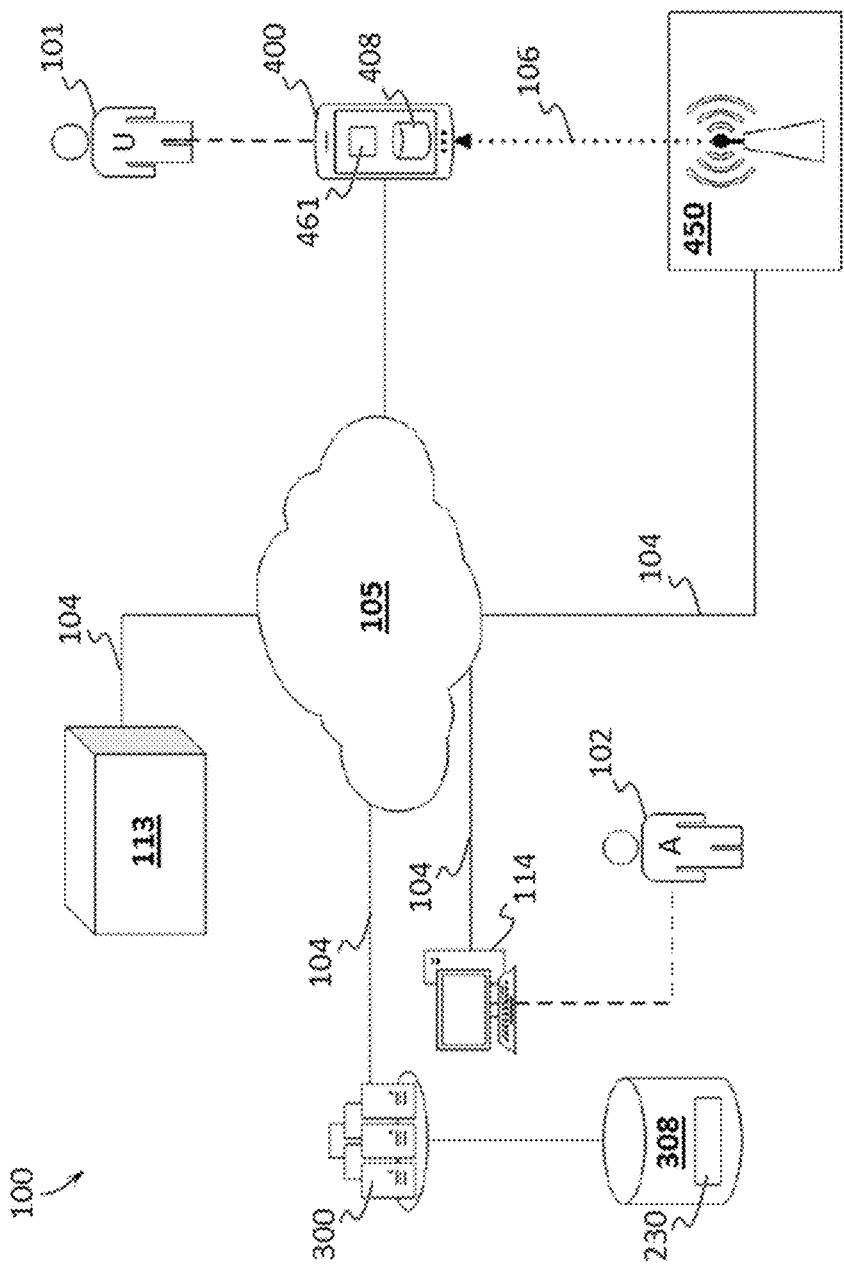
FIG. 1 depicts a block diagram depicting an example of the overall electronic ticket verification system architecture according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "electronic device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "mobile electronic device" or "mobile device". Some non-limiting examples of mobile devices include: cell phones, smartphones, tablet computers, laptop computers, wearable computers such as Apple Watch, other smartwatches, Fitbit, other wearable fitness trackers, Google Glasses, and the like.

The term "user device" or sometimes "electronic device" or just "device" as used herein is a type of computer or computing device generally operated by a person or user of the system. In some embodiments, a user device is a smartphone or computer configured to receive and transmit data to a server or other electronic device which may be operated locally or in the cloud. Non-limiting examples of user devices include: personal computers (PCs), workstations, laptops, tablet PCs including the iPad, cell phones including iOS phones made by Apple Inc., Android OS phones, Microsoft OS phones, Blackberry phones, or generally any electronic device capable of running computer software and displaying information to a user. Certain types of user devices which are portable and easily carried by a person from one location to another may sometimes be referred to as a "mobile device" or "portable device". Some non-limiting examples of mobile devices include: cell phones, smartphones, tablet computers, laptop computers, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as user devices either using wires or wirelessly allowing them to transmit and receive data. Non-limiting examples of data networks may include the internet or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a user device through the internet (i.e., the database is in the cloud) or alternatively in some embodiments the database may be stored on the user device or remote computer itself (i.e., local storage). A "data store" as used herein may contain or comprise a database (i.e. information and data from a database may be recorded into a medium on a data store).

For the purpose of this invention, a "beacon" or "beacon device" may be defined as any wireless electronic device that broadcasts a unique beacon address to any mobile electronic devices that are listening for beacon broadcasts. The beacon device has a beacon proximity range where a mobile device can determine if it is "in-proximity" or "out-of-proximity" based on the technology the beacon and mobile device are using for communication purposes. Embodiments of beacon technology that could be used both in a beacon and mobile device include Bluetooth Low Energy (BLE) or Near Field Communications (NFC) but is not limited to just these beacon technologies.

A "beacon device" may refer to an electronic device having a beacon (wireless capabilities) that may be physically located at the place of business where offline visual verification and redemption of tickets are to take place and contains a wireless radio that broadcasts a unique beacon address that may dynamically changes over time based on a system generated preconfigured time schedule. Since beacon addresses being broadcast from the beacons of smart beacon devices preferably may be constantly changing over time and are based only on system-known time schedules, the mobile device will only match an allowable beacon address within a system configured time window(s).

The term "electronic ticket" may refer to a set of data which may be used to create a graphic representation of a ticket on a display device of a mobile device. For example, this data may include a locked graphical representation of the ticket, a redeemable graphical representation of the ticket, and a redeemed graphical representation of the ticket. This data may also include other data, such as data describing one or more beacon addresses, time and date of the event data, data describing a mobile device associated with the electronic ticket, data describing a user of a mobile device associated with the electronic ticket, data describing a point of sale system through which an electronic ticket was purchased, and the like, which may be used by the system for visual verification and offline redemption of the electronic ticket.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented systems and methods for distributing and redeeming electronic tickets are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise an electronic ticket verification system ("the system") 100 according to some embodiments is presented. The system 100 is configured to facilitate the transfer of data and information between one or more beacon devices 450, mobile devices 400, and servers 300 over a data network 105. Each mobile device 400 may send data to and receive data from the data network 105 through a network connection 104. A data store 308 accessible by the server 300 may contain one or more databases such as a system database 230 (FIG. 10). The data may comprise any information pertinent to one or more metered products or services input into the system 100 including information on or describing one or more electronic tickets 108 (FIGS. 7-10) for one or more metered products or services, beacon addresses, and any other information which may describe a metered product or service and/or an electronic ticket 108.

In this example, the system 100 comprises at least one mobile device 400 (but preferably more than two mobile devices 400) configured to be operated by one or more users 101. Mobile devices 400 can be mobile electronic devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). The present invention may be implemented on at least one mobile device 400 and/or server 300 programmed to perform one or more of the steps described herein. In some embodiments, more than one mobile device 400 and/or server 300 may be used, with each being programmed to carry out one or more steps of a method or process described herein.

In some embodiments, the system 100 may be configured to facilitate the communication of information between one or more users 101, through their respective user devices 400, and servers 300 of the system 100. Users 101 of the system 100 may include individuals that have or desire to purchase an electronic ticket 108 which may be used to grant access to a metered product or service (hereinafter referred to as events) of a venue.

System servers 300, contain any needed information in a system database which may be stored in a data store 308 of a server 300 to create one or more electronic tickets 108 when a user 101 purchases electronic tickets electronic tickets 108 with a ticket application 461. The electronic tickets 108 purchased by a user 101 may be stored in a local electronic tickets database 421 (FIG. 35) on a data store 408 on the mobile device 400 of the user 101 for future offline verification and redemption purposes. The system servers 300 and ticket application 461 (running on the mobile device 400 of the user 101) may optionally integrate with a Point-of-Sale (POS) system 113 of the venue for the purpose of procuring electronic tickets 108 for users 101 who are customers of metered products or services (hereinafter referred to as events) of the venue.

In some embodiments, the beacon device 450 may be a wireless electronic device capable of wireless communication 106 that broadcasts a unique beacon address 237, 237A, 237B (FIGS. 2 and 10) that may be changed over time, preferably constantly changed over time, to any mobile devices 400 that are capable of receiving the wireless communication 106 of the smart beacon device 450. A beacon address may be any unique identifier for any beacon being used in the world at any given time. For example, a beacon address may be a Globally Unique Identifier (GUID) or Universally Unique Identifier (UUID) typically a 128-bit integer number used to identify resources. In further embodiments, the smart beacon device 450 may have a beacon proximity range where a mobile device 400 can determine if it is "in-proximity" or "out-of-proximity" based on the technology the beacon 450 and mobile device 400 are using for communication purposes. For example, using Bluetooth communication technology having a proximity range of thirty feet, if a beacon device 450 and a mobile device 400 are communicating, the beacon device 450 and a mobile device 400 may be determined to be in-proximity and within approximately thirty feet of each other.

In some embodiments the beacon device 450 may broadcast its beacon address 237 (FIG. 2) using the Bluetooth Low Energy (BLE) wireless protocol with the BLE proximity profile. In further embodiments the beacon device 450 may broadcast its beacon address 237 using the Near Field Communication (NFC) wireless protocol which by definition only communicates when they are "in-proximity". In still further embodiments, any other wireless communication protocol may be used.

The mobile device 400 typically may be a standard electronic mobile device 400 like an Android phone or iPhone but may be any other kind of electronic device that may be configured to wirelessly communicate/exchange data to receive an electronic ticket 108. The mobile device 400 preferably may be configured to receive beacon device 450 wireless broadcasts typically using Bluetooth Low Energy (BLE) or Near Field Communication (NFC), and the mobile device 400 may have a display screen for display of the electronic ticket 108 for visual verification and redemption purposes.

In some embodiments, the mobile device 400 may have a unique and preferably immutable mobile device identifier 234 (FIG. 10) such as which may be found in operating system of the mobile device 400 itself for device identity purposes for comparison purposes against the allowable customer device identifier which may be associated with the electronic ticket 108.

In some embodiments, the mobile device 400 of the user 101 may query secure storage on the mobile device 400 for an externally assigned device identifier 234 (FIG. 10) of the mobile device 400 which may be used for device identity purposes and for comparison purposes against an allowable ticket device identifier 236 (FIG. 10) associated with an electronic ticket 108.

The system 100 may be configured to provide offline verification of an electronic ticket 108 which may be used by a user 101 to gain access to an event. In some embodiments, offline verification may occur when the mobile device 400 may be within proximity of a required beacon device 450 at a required time or time period. In further embodiments, in order for offline verification to occur, the mobile device 400 must be a required mobile device 400. The where required beacon device 450, required time or time period, and/or required mobile device 400 may be determined by data associated with the electronic ticket 108 which may be stored in a database 408 in the mobile device 400 of the user 101. Subsequently, the mobile device 400 may present or display a human recognizable visual presentation of the electronic ticket 108 for offline verification purposes.

In some embodiments, offline redemption may occur when the mobile device 400 transitions from being "in-proximity" to being "out-of-proximity" with a beacon device 450. In other embodiments, offline redemption may require input received through the screen display 404A (FIGS. 7-9, 31), which may be a touch screen display, of the mobile device 400, such as a physical gesture which may be a swipe, tap, or any other input, on the mobile device 400 when the electronic ticket 108 (FIGS. 7-10) is redeemable. In yet further embodiments, offline redemption may occur when the mobile device 400 transitions to "in-proximity" with two beacon devices 450. For example, a first beacon device 450 may have a larger proximity range and may make the electronic ticket 108 to be redeemable and the second beacon device 450 may have a much smaller proximity range and may make the electronic ticket 108 redeemed.

In some embodiments, the electronic inventory of the system 100 may be managed for the venue by allowing an administrator user 102 to access to a system back office 114 to create visuals for the electronic tickets 108 and the business rules on how the electronic tickets 108 may be change over time, such as between redeemable and redeemed, for events and venues. The network 105 allows the exchange of data and messages between the major components of the system 100. In some embodiments the communications network 105 may be the Internet, while in other embodiments network 105 other communication protocols may be used such as wireless Bluetooth or wired RS-232 serial communication as examples.

Figure 2:
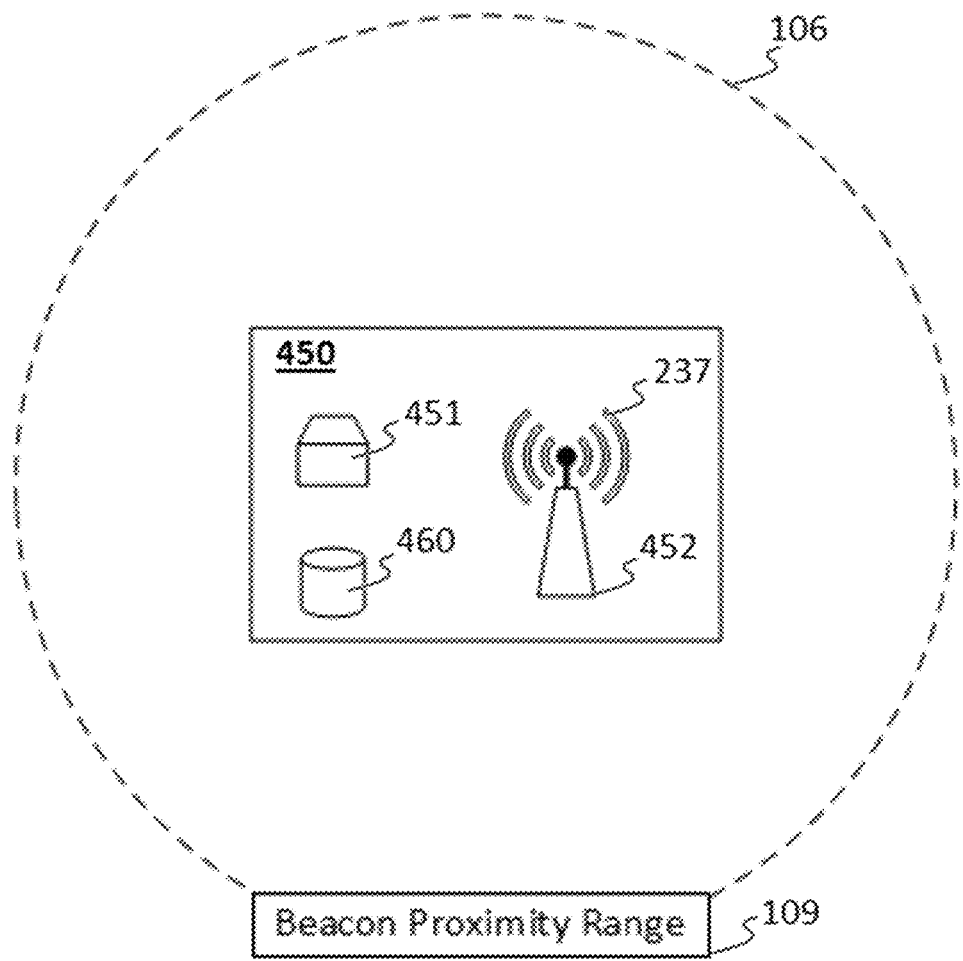
FIG. 2 shows a block diagram depicting an example of a beacon device at a location according to various embodiments described herein.
Figure 3:
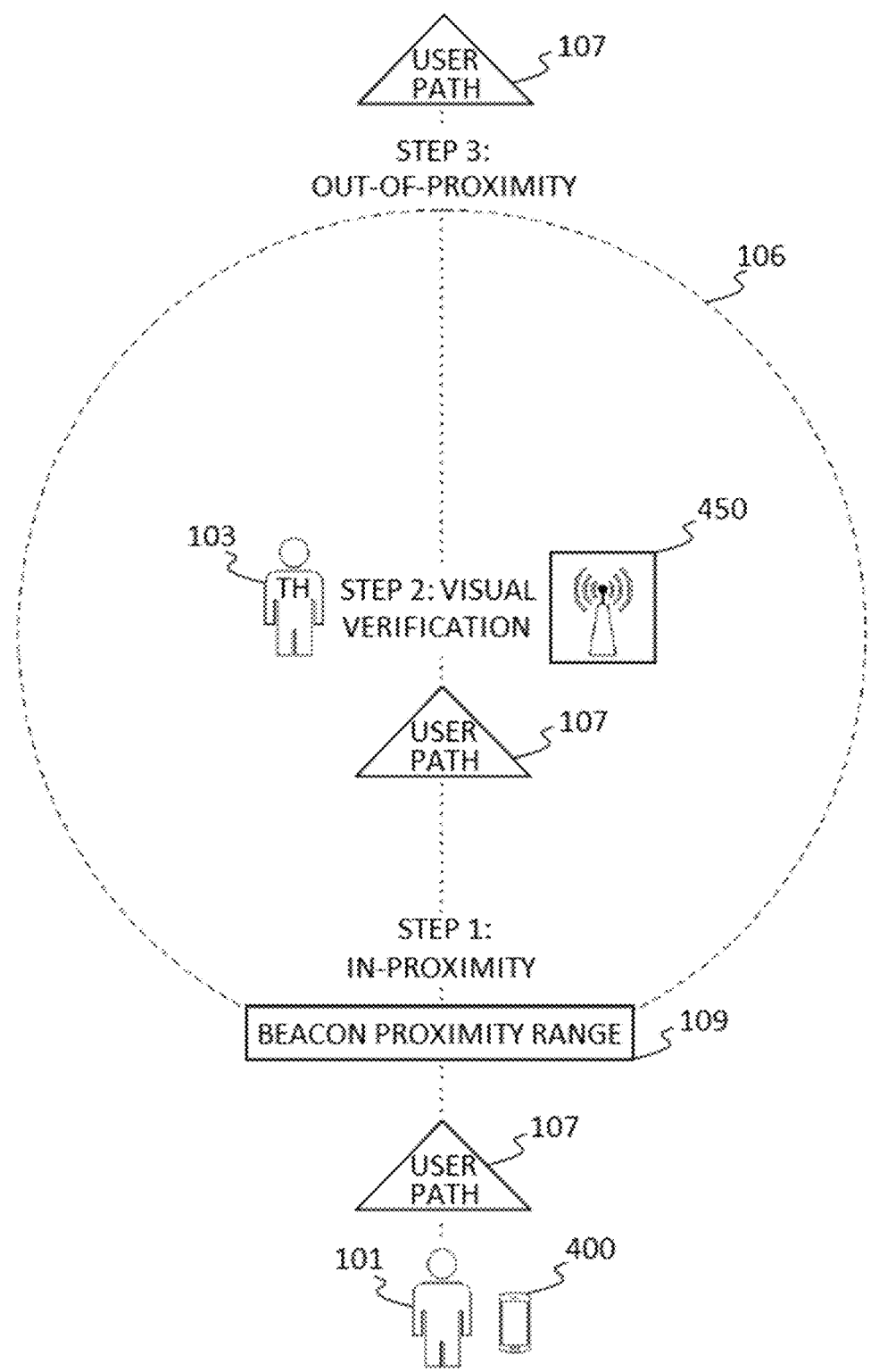
FIG. 3 illustrates is a block diagram depicting an overview of an example of a single beacon system embodiment of offline visual verification and redemption of an electronic ticket according to various embodiments described herein.
Figure 5:
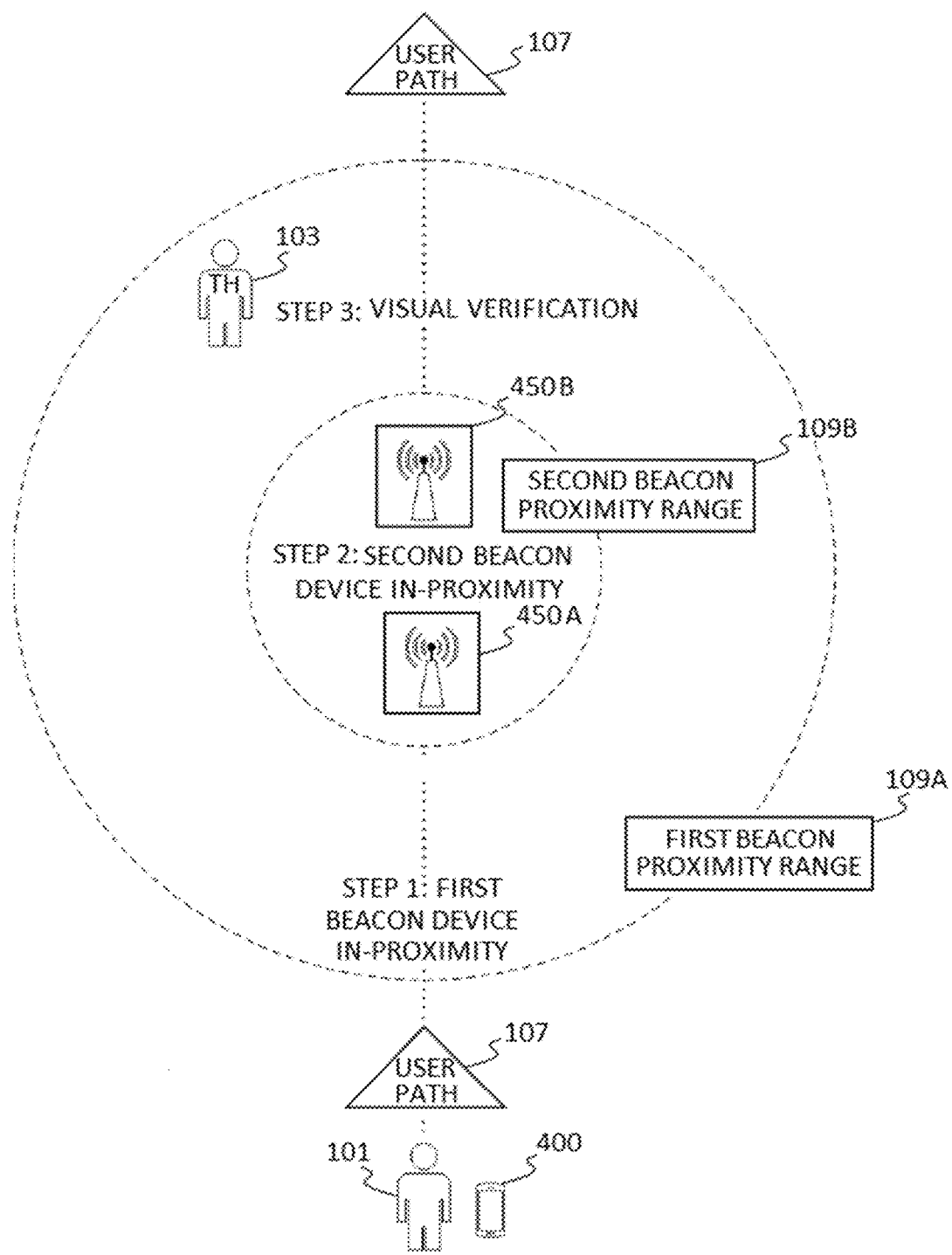
FIG. 5 shows a block diagram depicting an overview of an example of a two beacon device system embodiment of offline visual verification and redemption of an electronic ticket according to various embodiments described herein.

FIG. 2 illustrates an example of a beacon device 450 comprising a radio 452, processor 451, and an address schedule database 460. The beacon device 450 may be positioned at a location where a ticketable product or service is to occur such as an event, concert, show, fair, play, movie, rodeo, or any other type of event to which a user 101 may desire access and to which access may be governed by a ticket handler user 103 (FIGS. 3 and 5). In some embodiments, the beacon device 450 may broadcast a beacon address 237, in the wireless communication 106 provided by the beacon device 450 that dynamically changes over time according to the beacon address schedule 238 in the beacon address schedule database 460, preferably stored in data store 458, generated by the system 100. The beacon addresses 237 of the beacon address schedules 238 preferably are only known to the system 100 and are configured to be unique for the respective venue and optional events at the venue. As discussed in FIG. 29, the processor 451 of the beacon device 450 may run a long-running process where the runtime execution manages current time synchronization for the beacon device 450, importing of new beacon address schedules 238 from the system 100, changing the beacon address 237 being broadcast by the beacon device 450 when needed based on the current time, and sending periodic beacon device 450 status to system servers 300 for system health and diagnostic purposes. The wireless communication 106 range of a beacon device 450 may define the beacon proximity range 109 of the beacon device 450.

FIG. 3 illustrates an example of an overview for an embodiment of the system 100 which uses a single beacon device 450 for offline visual verification and redemption of an electronic ticket 108 on the mobile device 400 of a user 101. In some embodiments using a single beacon device 450 the offline visual verification and redemption of an electronic ticket 108 on the mobile device 400 of a user 101 may comprise three steps.

In the first step, the user 101 having a mobile device 400 may transition or move to be "in-proximity" of a beacon device 450 so that the mobile device 400 of the user 101 may be within the beacon proximity range 109 of the beacon device 450 which may be defined by the wireless communication range of the beacon device 450. The mobile device 400 of the user 101 may display or present one or more eligible locked electronic tickets 108 as redeemable. In this and in some embodiments, the user 101 may move or travel along a user path 107, such as a walk way or the like, which may direct the user 101 and their mobile device 400 into and out of proximity of a beacon device 450. The display or presentation may be triggered by the beacon address 237 contained in the wireless communication 106 of the beacon device 450 that is received by the mobile device 400. If the beacon address 237 and time match with ticket beacon address 241 and time data associated with the electronic ticket 108, the electronic ticket 108 may be displayed on the mobile device 400 as redeemable 206. In the second step, the user 101 may present the one or more electronic tickets 108 on their mobile device 400 to a ticket handler user 103 who may visually verify that the user 101 is a valid ticket holder for the respective event. If manual redemption is required, the electronic ticket 108 may be manually redeemed by the ticket handler user 103 or user 101 on the mobile device 400, such as by providing input which may be received through the touch screen display 404A of the mobile device 400. In the third step, the user 101 and their mobile device 400 may be moved or transitioned "out of proximity" of the beacon device 450. If manual redemption of the electronic ticket 108 was not required, then the electronic ticket 108 may be automatically redeemed on the mobile device 400 once the user 101 has passed out-of-proximity of the beacon device 450.

Figure 4:
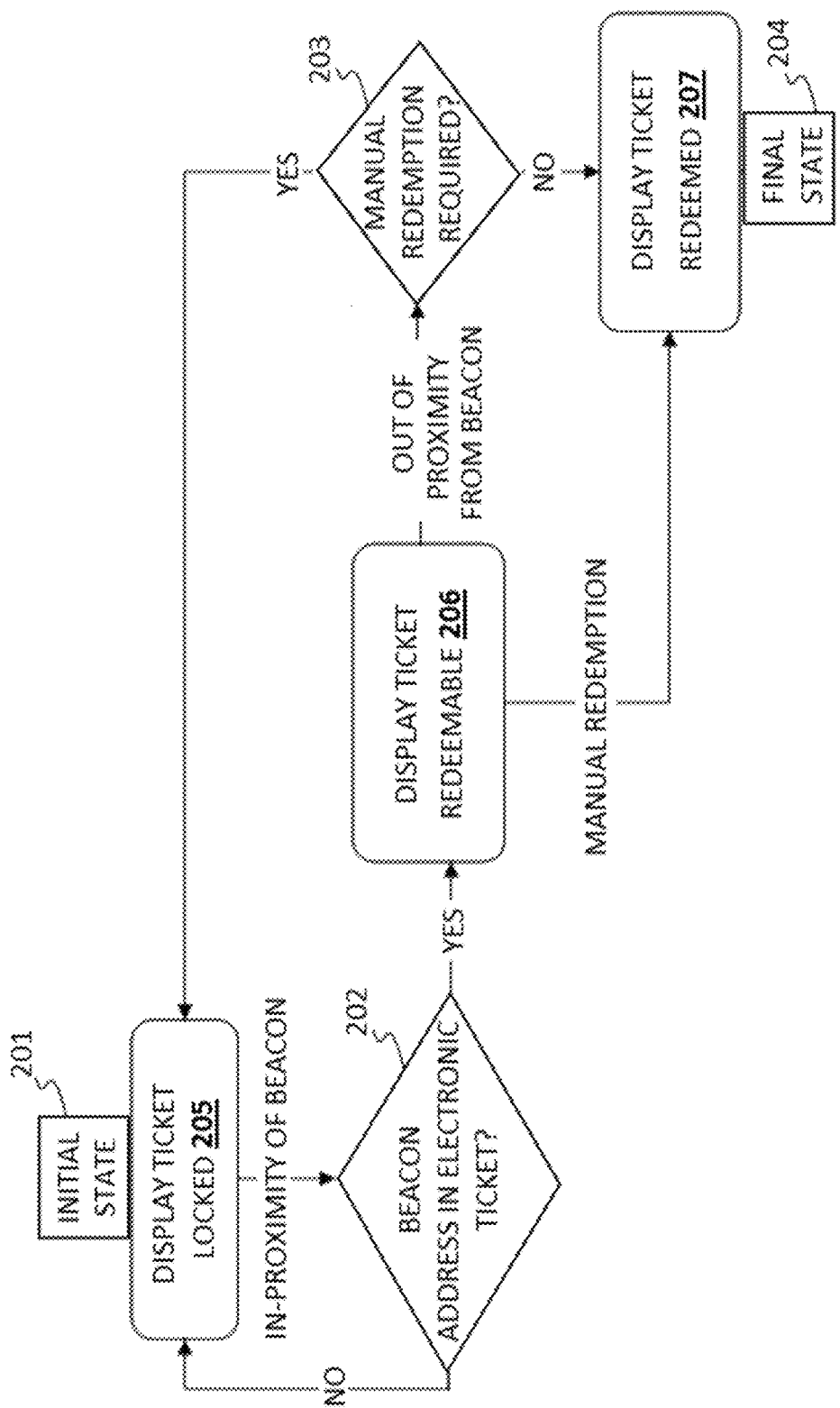
FIG. 4 depicts a state diagram of an example of the electronic ticket runtime state during a single beacon system embodiment of offline visual verification and redemption of an electronic ticket according to various embodiments described herein.

FIG. 4 illustrates an example of the electronic ticket runtime states which may occur during the single beacon device 450 embodiment of offline visual verification and redemption workflow of an electronic ticket 108 in the context of visual presentation and being physically stored on the user device 400 depicted in FIG. 3.

Figure 7:
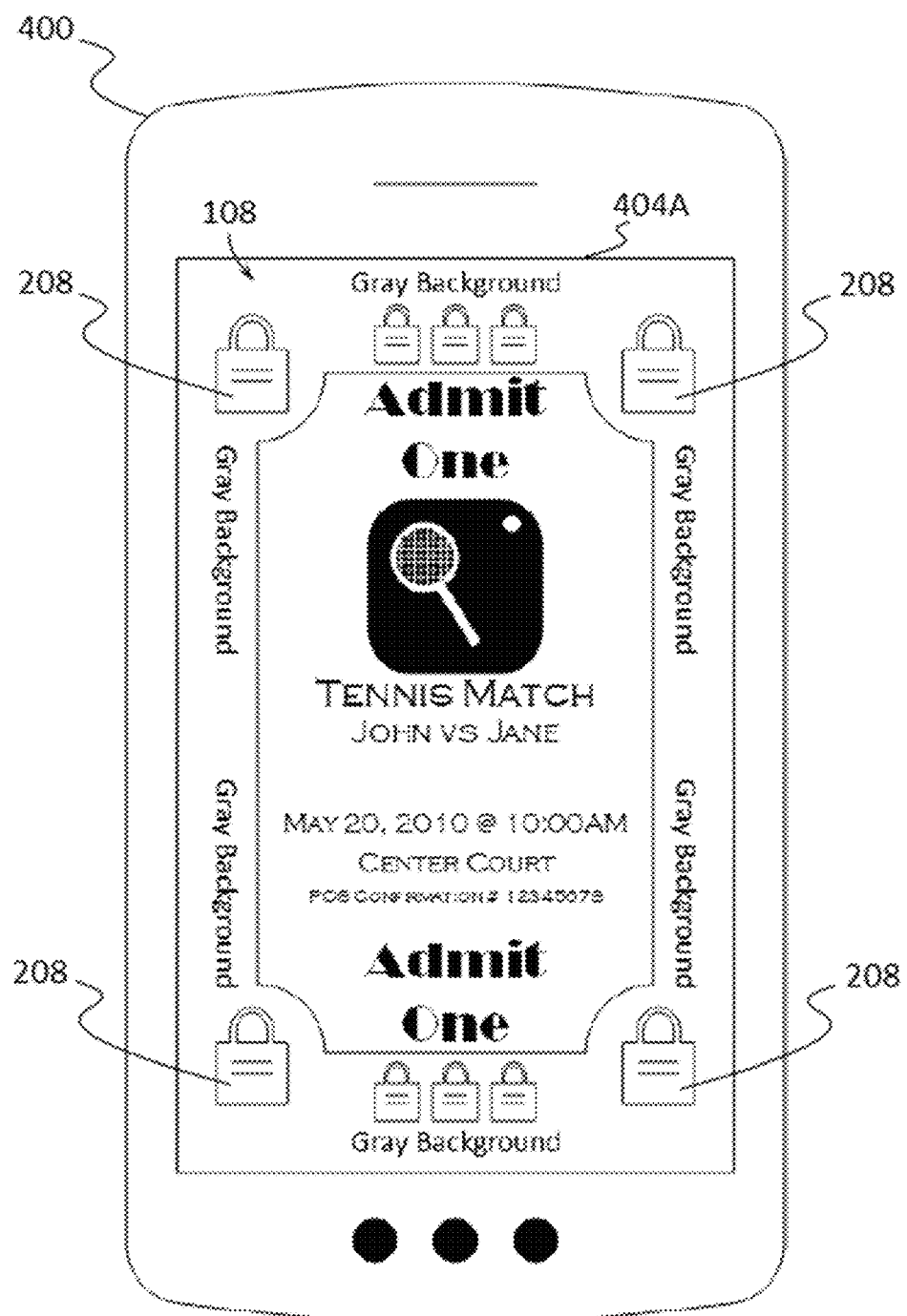
FIG. 7 depicts an example of a visual ticket in a locked state being displayed on a mobile device according to various embodiments described herein.

Referring now to FIGS. 3 and 4, in some embodiments, the initial state 201 of the electronic ticket 108 may be locked 205 so that the electronic ticket 108 may optionally be displayed on the mobile device 400 as ticket locked 205. The visual presentation of the electronic ticket 108 in the locked 205 state may be clear to a ticket handler user 103 thereby indicating that the user 101 should not be allowed access to the event. FIG. 7 shows an example of an electronic ticket 108 that is in the locked 205 state displayed on a mobile device 400. An electronic ticket 108 that is in the locked 205 state may include or be accompanied by locked indicating indicia 208, such as the padlock indicia of FIG. 7 or any other indicia, that may visually indicate to the ticket handler user 103 that the user 101 should not be allowed access to the event.

When the mobile device 400 is moved within the wireless communication range 106 of the beacon device 450, the mobile device 400 may be "in-proximity" of the beacon device 450 and the ticket application 461 may receive the wireless communication containing a beacon address 237 from the beacon device 450 and attempt to match both the mobile device identifier 234 unique to the mobile device 400, such as a MAC address, serial number, or the like, and the received beacon address 237 to the allowable ticket device identifier 236 and any allowable ticket beacon address 241 associated with the electronic ticket 108 in the local electronic tickets database 421 on a data store 408 of the mobile device 400 in decision block 202. If the ticket application 461 determines that the ticket device identifier 236 associated with the ticket 108 in the electronic tickets database 421 does not match the device identifier 234 of the mobile device 400 and/or if the received beacon address 237 does not match the ticket beacon address 241 associated with the ticket 108 in the electronic tickets database 421, the ticket application 461 may maintain the electronic ticket 108 in the locked 205 state. If the device identifiers 234, 236, and the beacon addresses 237, 241, match, the ticket application 461 may transition the electronic ticket 108 to the Redeemable 206 state.

Figure 8:
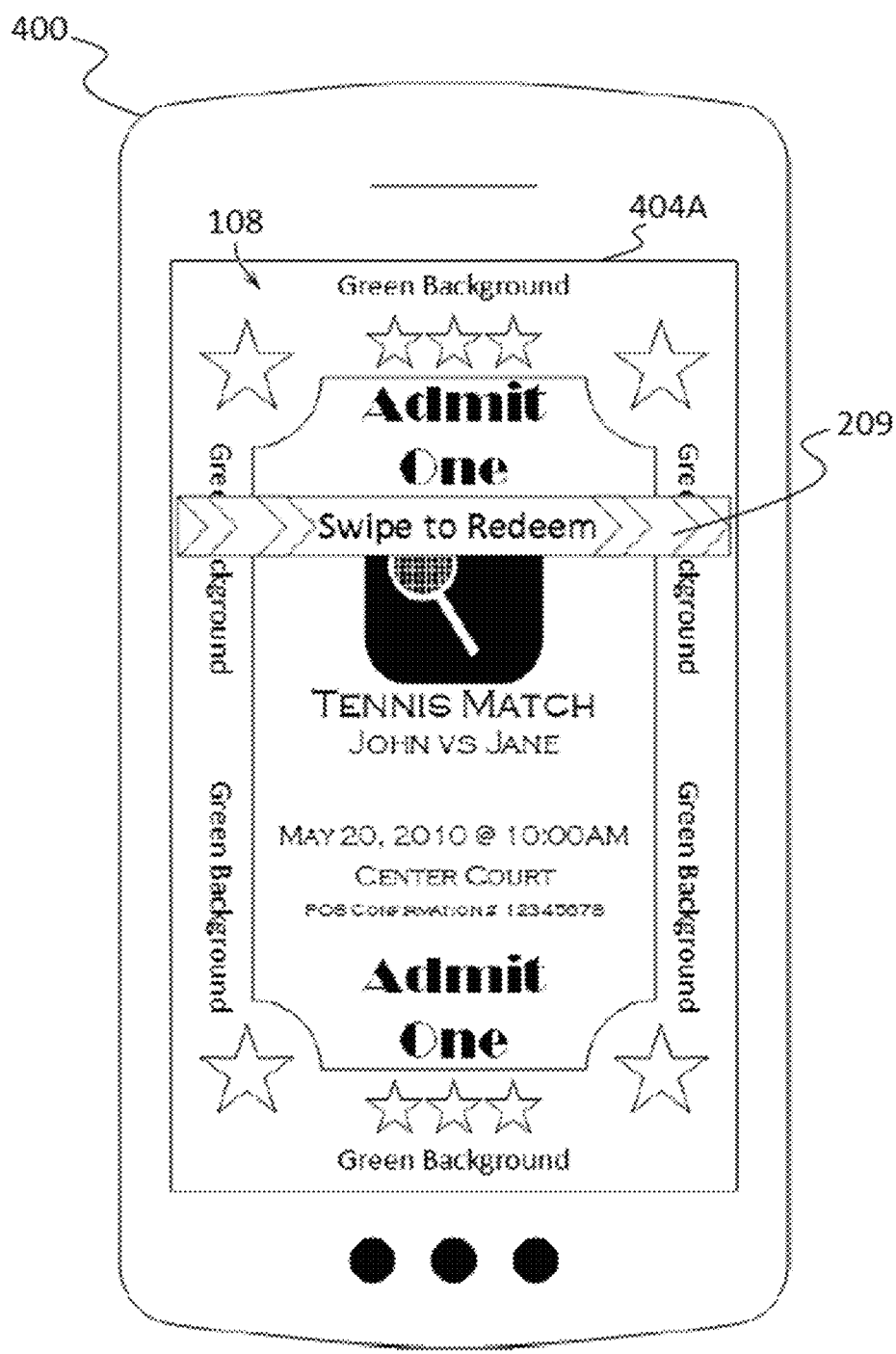
FIG. 8 shows an example of a visual ticket in a redeemable state with a manual redemption gesture being displayed on a mobile device according to various embodiments described herein.

The visual presentation of the electronic ticket 108 on the display screen of the mobile device 400 in the redeemable 206 state is visually clear to a ticket handler user 103 thereby indicating to the ticket handler user 103 that the user 101 is a valid ticket holder and should be allowed access to the event. FIG. 8 depicts an example of an electronic ticket 108 that is in the redeemable 206 state. An electronic ticket 108 that is in the redeemable 206 state may include or be accompanied by redeemable indicating indicia 209, such as the "Swipe to Redeem" indicia of FIG. 8 or any other indicia, that may visually indicate to the ticket handler user 103 that the user 101 is a valid ticket holder and should be allowed access to the event.

In some embodiments, the transition of an electronic ticket 108 from Redeemable 206 to Redeemed 207 (FIG. 9) depends on whether manual redemption is required or not. Manual redemption may be defined as a user, such as a ticket handler user 103 and/or customer user 101, preferably in the presence of a ticket handler user 103, physically redeeming the electronic ticket 108 preferably by input received through the touch screen display 404A of the mobile device 400 which preferably may include some physical gesture which may be made on or to the mobile device 400 of the user 101, on which the electronic ticket 108 is being visually displayed. For example, the input may be a physical gesture such as a physical swipe on the mobile device 400 simulating the "tearing" of an electronic ticket 108 by a ticket handler. The visual presentation on the mobile device 400 of the electronic ticket 108 in the redeemed 207 state is readily ascertainable to a ticket handler user 103 that the customer user 101 is a valid ticket holder and has already been allowed access to the product or service, reentry to the event is handled by the ticket handler user 103 dependent on the rules/policy at the venue. For example, an electronic ticket 108 in the redeemed 207 state may be readily ascertainable to a ticket handler user 103 by the display of redeemed indicating indicia 210, such as "Redeemed" or any other indicia, with the display of the electronic ticket 108 as shown in FIG. 9.

Figure 9:
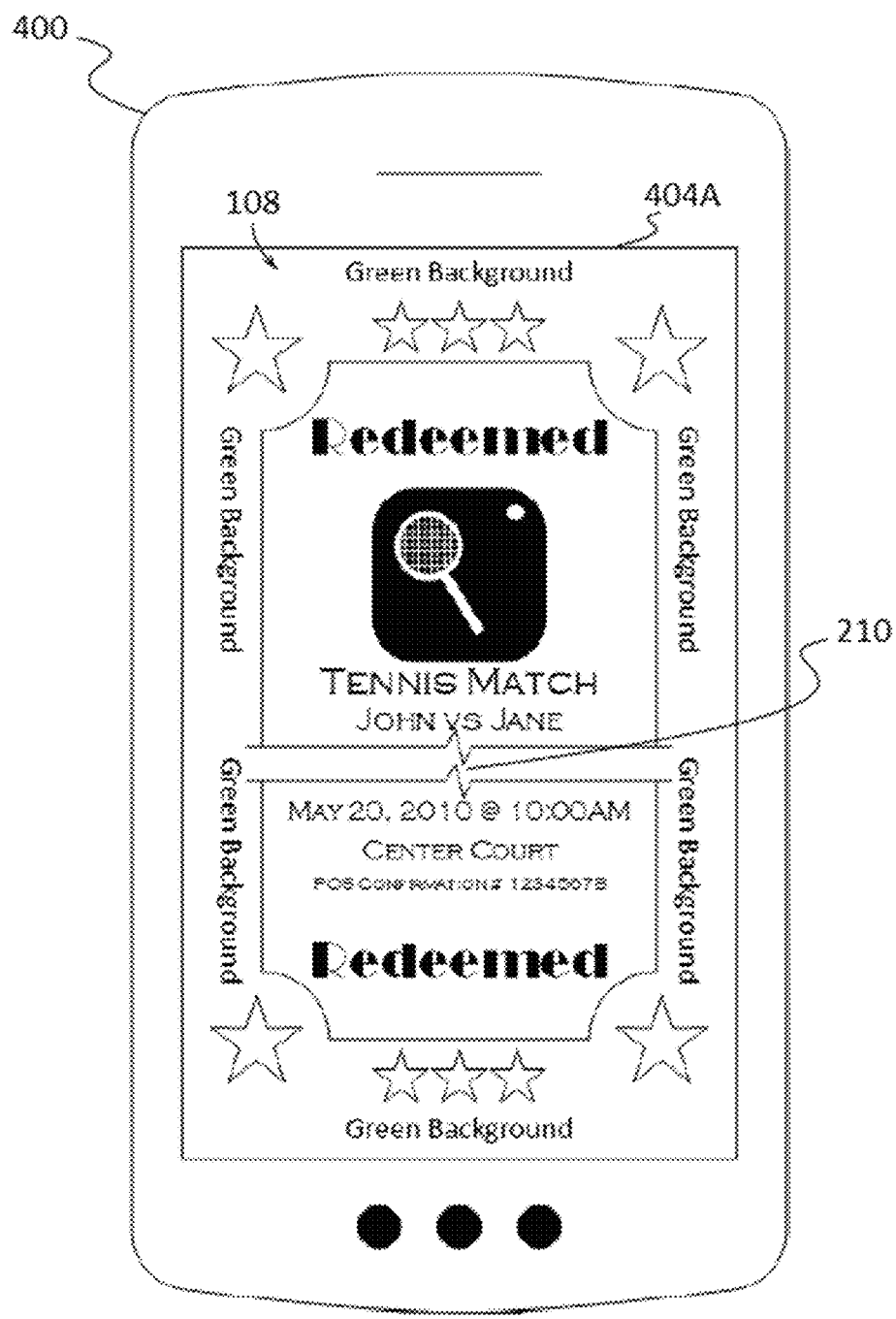
FIG. 9 illustrates an example of a visual ticket in a redeemed state being displayed on a mobile device according to various embodiments described herein.
Figure 10:
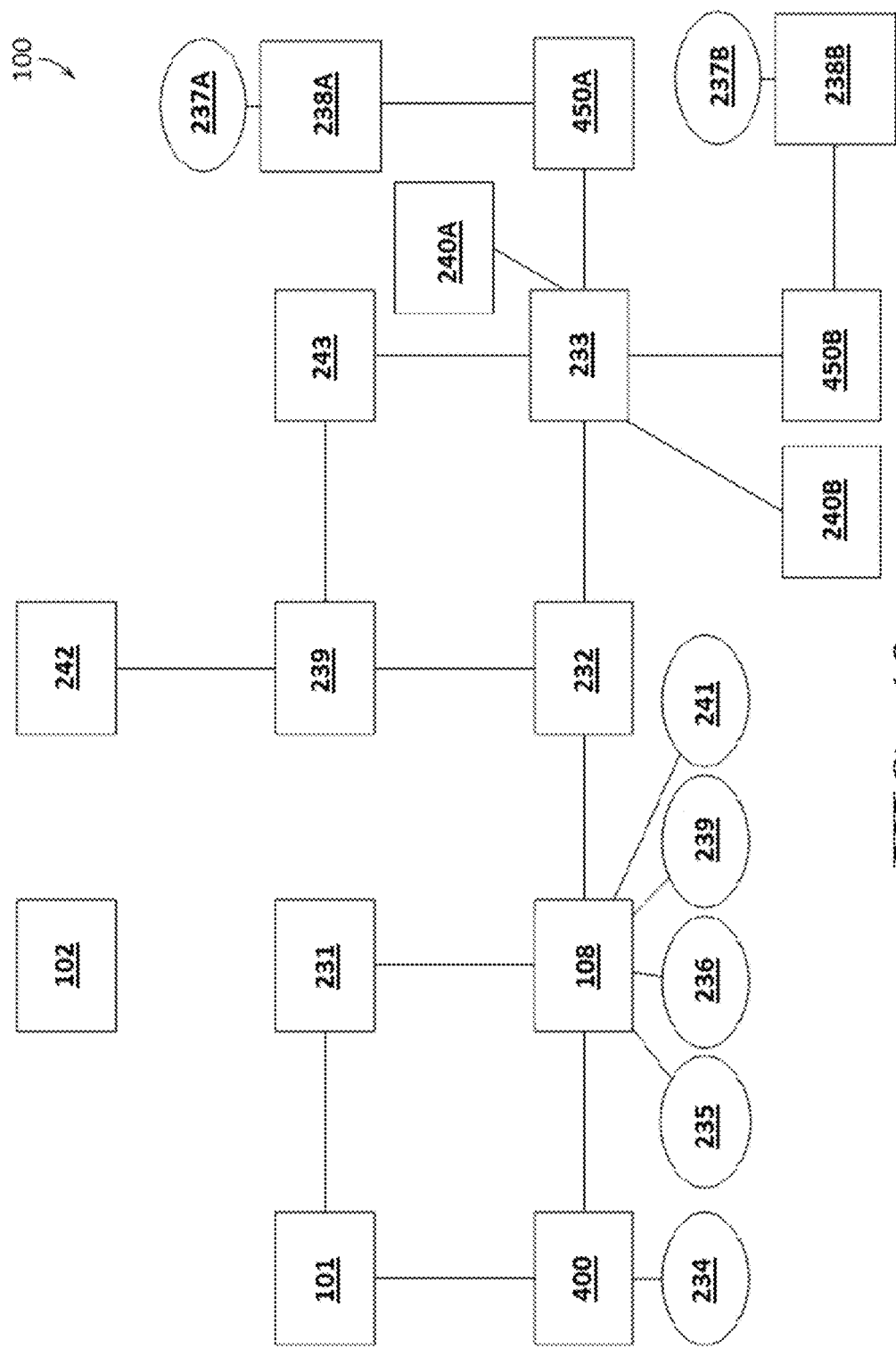
FIG. 10 depicts an entity relationship diagram depicting an example of a block diagram of the system according to various embodiments described herein.

FIG. 9 is an example of an electronic ticket that is in the redeemed 207 state. In some embodiments, when an electronic ticket 108 transitions to the redeemed 207 state the electronic ticket 108 may be persisted or maintained permanently as redeemed 207 on the mobile device 400 and may never be allowed to change from the redeemed 207 state.

If manual redemption is required, the visual presentation on the mobile device 400 of the electronic ticket 108 in the redeemable 206 may be readily ascertainable to a ticket handler user 103 that manual redemption is required and how to perform manual redemption. For example, an electronic ticket 108 in the redeemable 206 may be readily ascertainable to a ticket handler user 103 that manual redemption is required by the display of redeemable indicating indicia 209, such as "Swipe to Redeem" or any other indicia, with the display of the electronic ticket 108 as shown in FIG. 8.

FIG. 8 is an example of the electronic ticket that is in the redeemable 206 state where manual redemption is required. If manual redemption is not required, then the electronic ticket 108 may be transitioned to the redeemed 207 state by the ticket application 461 when the mobile device 400 is moved "out-of-proximity" of a beacon device 450. Preferably, no action by the ticket handler user 103 and/or customer user 101 may be required.

FIG. 5 illustrates an example of an overview for an embodiment of the system 100 which uses two beacon devices 450, such as a first beacon device 450A and a second beacon device 450B, for offline visual verification and redemption of an electronic ticket 108 on the mobile device 400 of a user 101. Referring also to FIG. 10, in this and some two beacon device 450 embodiments of the system 100, a first beacon device 450A may be configured to broadcast a redeemable type first beacon address 237A while a second beacon device 450B may be configured to broadcast a redeemed type second beacon address 237B. Redeemable type beacon addresses 237 may be used for the transitioning of electronic tickets 108 from a locked 205 state to a redeemable 206 state on a mobile device 400 by the ticket application 461. Redeemed type beacon addresses 237 may be used for the transitioning of electronic tickets 108 from either a Locked 205 or redeemable state 206 to a redeemed 207 state on a mobile device 400 by the ticket application 461.

In some embodiments, one or more ticket beacon address 241 may be associated with an electronic ticket 108 and stored with the electronic ticket 108 in the data store 408 of the mobile device 400. The stored ticket beacon address 241 may have a redeemable or redeemed type associated with them so the ticket application 461 running on the mobile device 400 knows what type of beacon address to handle when handling correct beacon address 237 broadcasts from systems 100 utilizing one or more beacon devices 450.

In some embodiments of a system 100 using two beacon devices 450, such as a first beacon device 450A and a second beacon device 450B, the offline visual verification and redemption of an electronic ticket 108 on the mobile device 400 of a user 101 may comprise three steps.

In the first step, the user 101 with their mobile device 400 may move or transition into the first beacon device 450A proximity range 109A to be "in-proximity" of a first beacon device 450A which has been configured to broadcast "redeemable" beacon addresses. The ticket application 461 running on the mobile device 400 may present or display one or more eligible locked electronic tickets 108 as redeemable 206 which are associated with the redeemable beacon address 237 broadcast by the first beacon device 450A.

In the second step, the user 101 with their mobile device 400 may move or transition along a user path 107 into the second beacon device 450B proximity range 109B to be "in-proximity" of a second beacon device 450B which has been configured to broadcast one or more "redeemed" beacon addresses. Upon detection of the one or more "redeemed" beacon addresses which match one or more "redeemed" beacon addresses associated with the one or more electronic tickets 108 in the data store 408 of the mobile device 400, the ticket application 461 running on the mobile device 400 may transition the one or more eligible locked or redeemable 206 electronic tickets 108 to the redeemed 207 state and then present or display the one or more eligible redeemed 207 electronic tickets 108 on the display screen of the mobile device 400.

In a third step, the user 101 may present the redeemed 207 electronic tickets 108 displayed on the mobile device 400 to a ticket handler user 103 who may visually inspect and verify that the user's 101 redeemed 207 electronic tickets 108 correspond to the event thereby indicating that the user 101 is a valid ticket holder for the respective event.

Figure 6:
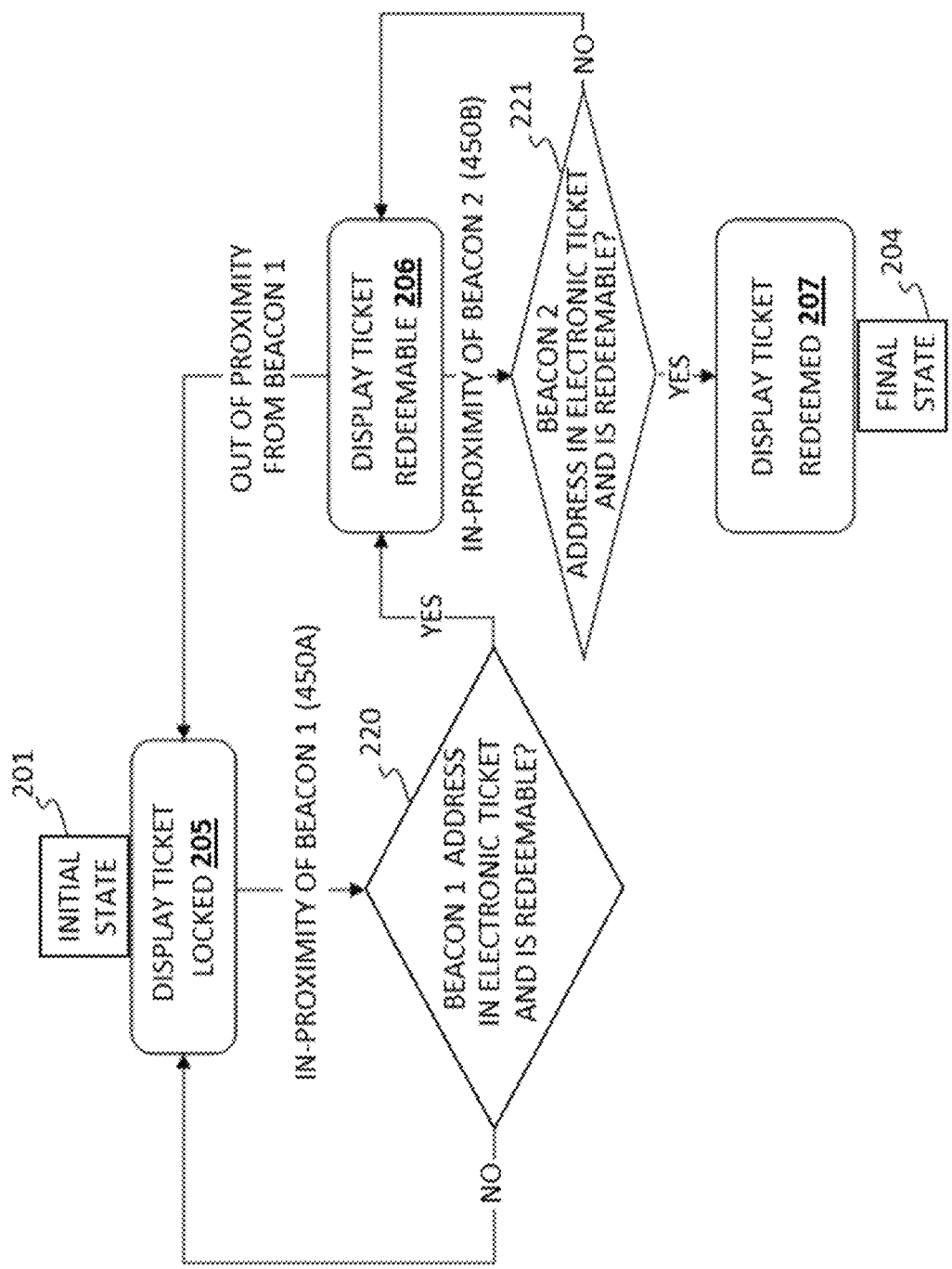
FIG. 6 illustrates a state diagram of an example of the electronic ticket runtime state during a two beacon device system embodiment for offline visual verification and redemption of an electronic ticket according to various embodiments described herein.

FIG. 6 illustrates an example of the electronic ticket runtime states which may occur during a two or more beacon device 450 system 100 embodiment of offline visual verification and redemption workflow of an electronic ticket 108 in the context of visual presentation and being physically stored on the user device 400 depicted in FIG. 5.

An electronic ticket 108 may be in the Locked 205 initial state optionally resulting in locked indicating indicia 208 (FIG. 7) being displayed with the electronic ticket 108 on the mobile device 400 of the user 101. The visual presentation of the electronic ticket 108 in the Locked 205 state may contain locked indicating indicia 208, such as a padlock icon or any other indicia, so that it is clear to a ticket handler user 103 that the customer user 101 should not be allowed access to the event. FIG. 7 is an example of an electronic ticket 108 that is in the Locked 205 state.

When the mobile device 400 is "in-proximity" of the first beacon device (beacon 1) 450A the ticket application 461 may receive a wireless communication containing a beacon address 237 from the first beacon device 450A and attempt to match both the unique mobile device identifier 234 of the mobile device 400 and the received beacon address 237 broadcast by the first beacon device 450A to the ticket device identifier 236 and any allowable redeemable ticket beacon address 241 associated with the electronic ticket 108 in the local electronic tickets database 421 on a data store 408 of the mobile device 400 in decision block 220. If the ticket device identifier 236 associated with the ticket 108 in the electronic tickets database 421 does not match the mobile device identifier 234 of the mobile device 400 and/or if the received beacon address 237 does not match the ticket beacon address 241 associated with the ticket 108 in the electronic tickets database 421, the ticket application 461 may maintain the electronic ticket 108 in the locked 205 state.

If the ticket application 461 determines that both the identifier unique to the mobile device 400 and the received beacon address 237 match the ticket device identifier 236 and any allowable ticket beacon address 241 associated with the electronic ticket 108, the ticket application 461 may transition the electronic ticket 108 to the Redeemable 206 state. The visual presentation of the electronic ticket 108 on the display screen of the mobile device 400 in the Redeemable 206 state is visually clear to a ticket handler user 103 thereby indicating to the ticket handler user 103 that the user 101 is a valid ticket holder and should be allowed access to the event. FIG. 8 depicts an example of an electronic ticket 108 that is in the Redeemable 206 state. An electronic ticket 108 that is in the Redeemable 206 state may include or be accompanied by redeemable indicating indicia 209, such as the "Swipe to Redeem" indicia of FIG. 8 or any other indicia, that may visually indicate to the ticket handler user 103 that the user 101 is a valid ticket holder and should be allowed access to the event.

When the mobile device 400 enters the second beacon device 450B proximity range 109B the mobile device 400 is "in-proximity" of the second beacon device 450B. In decision block 221 the ticket application 461 may determine if the mobile device identifier 234 of the mobile device 400 and the second beacon address 237B received from the second beacon device 450B match the allowable ticket device identifier 236 and any allowable redeemed ticket beacon address 241 associated with the electronic ticket 108.

If the unique mobile device identifier 234 of the mobile device 400 and the second beacon address 237B received from the second beacon device 450B match, the ticket application 461 may transition the electronic ticket 108 from either a Locked 205 or Redeemable 206 state to the Redeemed 207 state. FIG. 9 is an example of an electronic ticket 108 that is in the Redeemed 207 state. When an electronic ticket 108 transitions to the Redeemed 207 state the electronic ticket 108 may be persisted or displayed permanently as Redeemed 207 (having redeemed indicating indicia 210) on the mobile device 400 and may never be allowed to change out of the Redeemed 207 state. The visual presentation of the electronic ticket 108 on the mobile device 400 in the Redeemed 207 state may be observed by a ticket handler user 103 to indicate that the customer user 101 is a valid ticket holder and should be allowed access to the event.

FIG. 7 is an example of an electronic ticket 108 that is in the Locked 205 state which is being displayed on a mobile device 400. The locked 205 state may include locked indicating indicia 208, such as the padlock icons, displayed on or with the electronic ticket 108. In this embodiment and for example, an electronic ticket 108 may comprise a gray background and lock graphic images or other locked indicating indicia 208 which may be the visual cues indicating to an observer that the electronic ticket 108 is in the Locked 205 state.

FIG. 8 is an example of an electronic ticket 108 that is in the Redeemable 206 state which is being displayed on a mobile device 400. The Redeemable 206 state may include redeemable indicating indicia 209, such as the "Swipe to Redeem" words and slider displayed on or with the electronic ticket 108. In this embodiment and for example, an electronic ticket 108 may comprise a green background and star graphic images or other redeemable indicating indicia 209 which may be the visual cues indicating to an observer that the electronic ticket 108 is in the Redeemable 206 state, although other visual cues may be used.

FIG. 8 also shows an example of an electronic ticket 108 that is in the Redeemable 206 state where manual redemption may be required. In this embodiment the "Swipe to Redeem" redeemable indicating indicia 209 overlay may be the visual cue the electronic ticket 108 requires manual redemption and how to perform manual redemption.

FIG. 9 is an example of an electronic ticket 108 that is in the Redeemed 207 state which is being displayed on a mobile device 400. The Redeemed 207 state may include redeemed indicating indicia 210, such as the "Redeemed" words displayed on or with the electronic ticket 108. In this embodiment and for example, an electronic ticket 108 may comprise a green background, star graphic images, and the ticket presented torn are the visual cues indicating to an observer that the electronic ticket 108 is in the Redeemed 207 state.

FIG. 10 illustrates an example of a logical data model depicting some of the components and entities and their relationships to each other that can be used for designing the system 100 and what data may be exchanged between.

The customer user 101 may have one or more mobile devices 400 and which they may use to create one or more orders 231. The mobile devices 400 may contain one or more electronic tickets 108 in its respective data store 408 (FIG. 31) that may be the line items of an order 231 and can be redeemed for access to a product or service of an event 232 at a venue 233. A mobile device 400 may have a unique device identifier 234 that matches what the ticket application 461 may determine at runtime to be the unique device identifier 234 of the mobile device 400. For example, the ticket application 461 may read the serial number or MAC address of the mobile device 400 and determine the serial number or MAC address to be the device identifier 234.

In some embodiments, the electronic ticket 108 may comprise or be associated with POS ticket data 235, ticket device identifier 236, ticket beacon address 241, and visual ticket 239 data all of which may be stored in the electronic tickets database 421 on the data store 408 of the mobile device 400.

POS Ticket Data 235 may include data which embodies the Point-of-Sale (POS) system 113 (FIG. 1) specific data a human or computer system would need to uniquely identify, purchase, and redeem a ticket for the respective Point-of-Sale (POS) system 113. This data may include information such as POS confirmation number, POS transaction number, etc.

A ticket device identifier 236 may include data which embodies the allowable mobile device 400 (preferably which may exactly match the mobile device identifier 234) based on system known unique customer device identifying data and information. In some embodiments, the ticket application 461 may cryptographically query this data for a match based upon the unique device identifier 234 of the mobile device 400 which may be determined at runtime as part of the workflow to determine if the mobile device 400 should display the electronic ticket 108 runtime state as locked 205, redeemable 206, or redeemed 207 on the mobile device 400.

Beacon Addresses 237 may include data which embodies all of the allowable beacon addresses 237 based on system known beacon devices 450 physically located at the place of business and system known beacon address schedules 239 for the respective beacon devices 450 for a specific time window for the where and when the electronic ticket 108 is allowed to be offline visually verified and redeemed. In some embodiments, a first beacon device 450A may broadcast a first beacon address 237A, while a second beacon device 450B may broadcast a second beacon address 237B. The ticket application 461 may cryptographically query this data for a match when receiving any beacon address 237 broadcast as part of the workflow to determine if the mobile device 400 should display the electronic ticket 108 runtime state as locked 205, redeemable 206, or redeemed 207 on the mobile device 400. For a two or more beacon device 450 system 100, beacon addresses 237 also may also have a redeemable or redeemed type associated to each beacon address 237 so the ticket application 461 may determine which state to transition the electronic ticket 108 into when it receives a matching beacon address 237.

Visual Ticket data 239 may include visual data 242 which embodies the visual validation display data used by the ticket application 461 to generate and visually present an electronic ticket 108 on the display of a mobile device 400, such as locked indicating indicia 208, redeemable indicating indicia 209, redeemed indicating indicia 210, and the like, so that any human observer could visually validate whether the respective electronic ticket 108 holder should be allowed to redeem the respective product or service.

The venue 233 may have one or more events 232 that represent a product or service a customer user 101 would want access to at the venue 233 via a purchase. The venue 233 may contain one or more beacon devices 450 and may have an associated beacon address rule 240 that defines how the beacon address schedule 238 should be constructed over time.

The beacon device 450 may include one or more beacon address schedules 238 that may be constructed based on the parent venue 233 associated beacon address rule 240. The beacon address schedule 238 may include one or more beacon addresses 237 that physical beacon devices 450 will be broadcasting during specific time windows over time. In further embodiments, a venue 233 having two or more beacon devices 450 may have a first beacon device 450A may broadcast a first beacon address 237A, while a second beacon device 450B may broadcast a second beacon address 237B. The first beacon device 450A may broadcast a first beacon address 237A which may be dictated by a first beacon address schedule 238A. The second beacon device 450B may broadcast a second beacon address 237B which may be dictated by a second beacon address schedule 238B. Each beacon address schedule 238, 238A, 238B, may include a time period during which the respective beacon device 450, 450A, 450B, may broadcast a respective beacon address 237, 237A, 237B.

The visual ticket data 239 may contain or be associated with visual data 242 that the ticket application 461 may use to generate a visual representation of the electronic ticket 108 and to visually present the electronic ticket runtime state as locked 205, redeemable 206, or redeemed 207 on the display screen of the mobile device 400.

The visual ticket data 239 may be temporally associated to a venue 233 by a visual ticket schedule 243 where the ticket application 461 can use the visual ticket schedule 243 to determine what visual data 242 to use when creating electronic tickets 108 for an event 232 at the venue 233. The visual ticket schedule 243 may include data such as a daily schedule, weekly schedule, or a user-defined custom schedule of visual tickets. The visual ticket data 239 may be directly associated to an event 232 in which case this directly associated visual ticket data 239 may override the visual data 242 that would have been used by examining the visual ticket schedule 243 for the respective venue 233 of the event 232.

The administrator user 102 represents any external user of the system back office 114 (FIG. 1) for configuration, reporting, inputting, changing, or other manipulation of data describing venues 233, venue events 232, visual ticket data 239, visual ticket schedule 243 for a venue 233, visual data 242, direct associations to events 232, customer users 101, mobile devices 400, orders 231, and electronic tickets 108.

Figure 11:
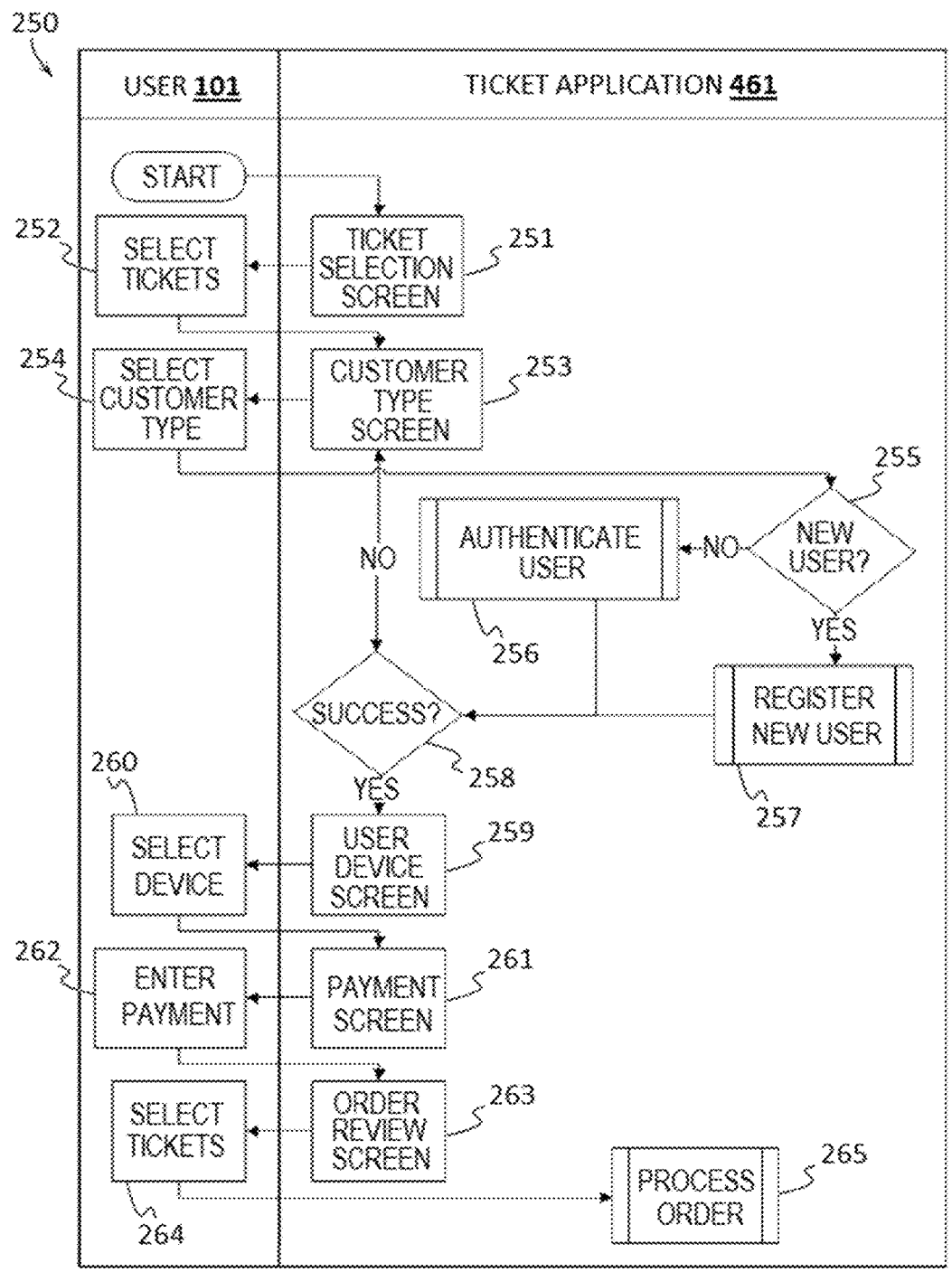
FIG. 11 shows a flowchart of an example of a method for electronic ticket purchase by a user according to various embodiments described herein.

FIG. 11 illustrates an example of a method for electronic ticket 108 purchase by a user 101 ("the method") 250 using a ticket application 461 which may be running on the mobile device 400 of the user 101. In some embodiments, a user 101 may interact with a ticket application 461 to purchase electronic tickets 108 that may be downloaded to the electronic tickets database 421 on their mobile device 400 and stored for future offline verification and redemption purposes.

In some embodiments, the ticket application 461 may be an application executing on the mobile device 400 of the user 101. In other embodiments, the ticket application 461 may be an application executing a self-service kiosk. In still further embodiments, the ticket application 461 may be an application executing on a website being browsed on a desktop or mobile computing device or any other type of computing electronic device.

In some embodiments, the ticket application 461 may present an order creation screen or ticket selection screen 251 where the user 101 can select tickets 252 to events with intent for purchase. Next, the ticket application 461 may present a new or existing user or customer screen 253 where the customer can select 254 whether they are an existing or a new user 101 or customer with the system 100.

Depending on whether the user 101 is an existing or new customer in decision block 255, the ticket application 461 may execute either the authenticate user workflow 256 or the register new user workflow as will be discussed in FIG. 12 and FIG. 13 respectively. After the user 101 is either authenticated or registered with the system 100, such as by entering log in information or other contact information, the ticket application 461 may present the user device 259 and payment selection 261 screens where the user 101 can select and enter customer device information 260 to receive the electronic tickets 108 and payment details 262 for procuring the electronic tickets 108. If the user 101 only has one mobile device 400 then the device selection screen 259 can be skipped altogether. Preferably, the ticket application 461 may present an order review screen 263 where the customer may get a summary of the entire order with an opportunity to modify the current order and after possible modification of the order select to purchase tickets 264. As will be discussed in FIG. 15, the ticket application 461 may process the order by integration with the Point-of-Sale (POS) system 113 (FIG. 1) and/or the system servers 300 (FIG. 1).

When the process order workflow is complete and the order is processed 265, the ticket application 461 may present to the user 101 the process order workflow result. In one possible failure scenario, the system 100 may be unable to procure the tickets 108 with the POS system 113. The ticket application 461 would present a POS order failure screen detailing the reason why the POS 113 was unable to procure the electronic tickets 108.

In another possible failure scenario, the system 100 may be able to procure the tickets 108 with the POS 113 but unable to create the electronic tickets 108 with the system servers 300, in this case the user 101 does have tickets 108 with the POS 113 but not electronically on the mobile device 400. The ticket application 461 may present a partial order confirmation screen detailing success in procuring tickets 108 with the POS 113 but unable to create electronic tickets 108.

In another possible failure scenario, the system 100 may be able to procure the tickets 108 with the POS 113 and able to create electronic tickets 108 with the system servers 300 but may be unable to download the electronic tickets 108 to the mobile device 400. The ticket application 461 may present an unable to download electronic tickets screen detailing success in procuring tickets 108 with the POS 113 and success with creating the electronic tickets 108 but unable to download the created electronic tickets 108 to the mobile device 400.

For any of the failure scenarios, the ticket application 461 may present options to the user 101 on how to handle any failures in the purchasing of tickets 108. In some embodiments, the ticket application 461 may be configured to perform one or more of the following: allow the user 101 the option to allow the system servers 300 to try and create or download the electronic tickets 108 again; allow the user 101 another redemption option for the POS 113 procured tickets 108; fall back to printing paper tickets as the redemption option for the POS 113 procured tickets 108; and/or present purchasing tickets at this time is not possible and to try again in the near future.

In the success scenario, the system 100 may be able to procure the tickets 108 with the POS 113, create electronic tickets 108 with the system servers 300, and download the electronic tickets 108 to the mobile device 400 of the user 101 for later offline verification and redemption purposes. For this scenario, the ticket application 461 may present a complete order confirmation screen presenting overall success.

Figure 12:
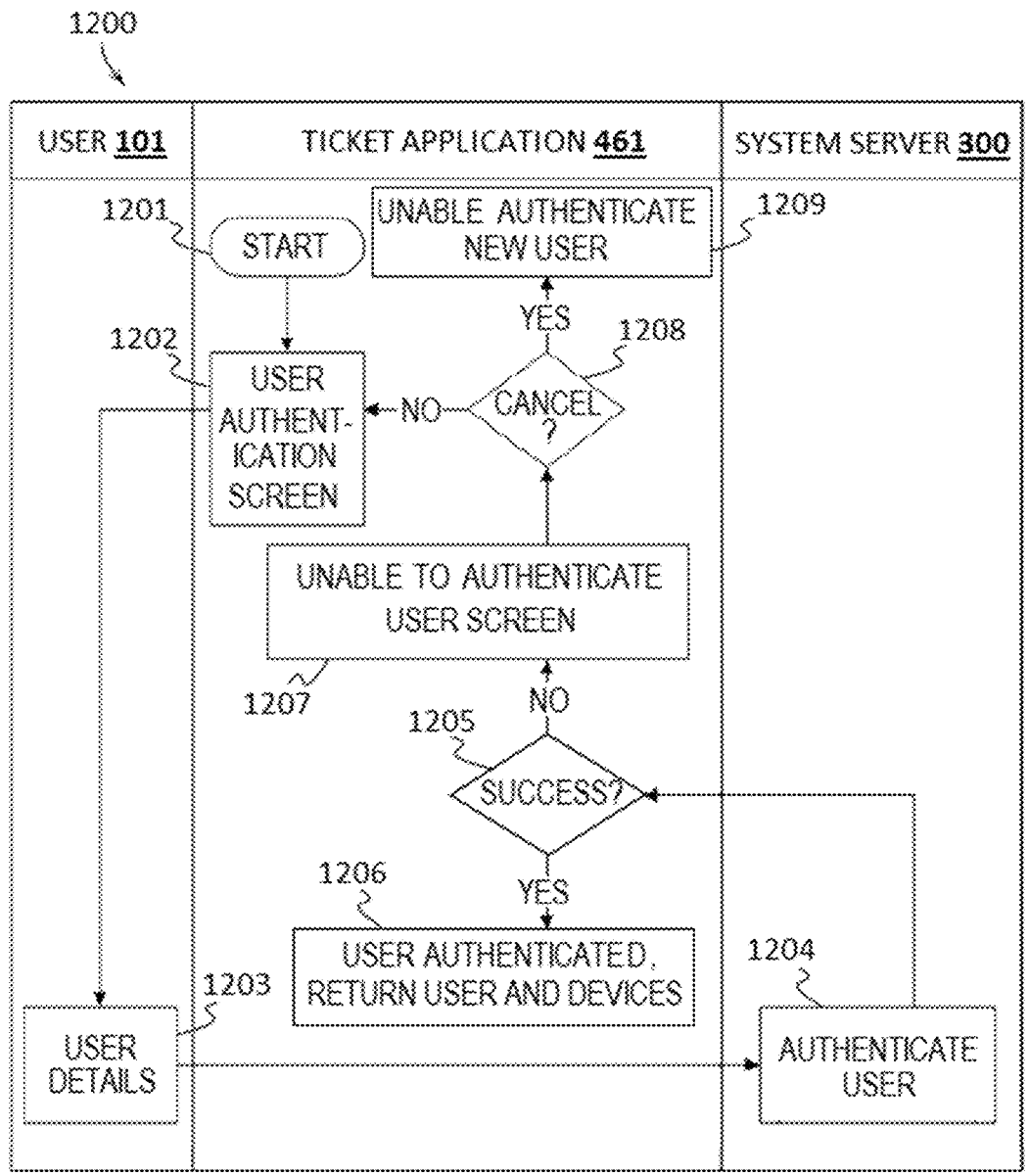
FIG. 12 illustrates a flowchart of an example of a method of authenticating a customer user between the ticket application and system server according to various embodiments described herein.

FIG. 12 shows an example of a method of authenticating a customer user 101 between the ticket application 461 and system server 300 ("the method") 1200 as part of a general electronic ticket 108 purchase workflow according to various embodiments described herein. The method 1200 may be used by the ticket application 461 to authenticate an existing customer user 101 purchasing tickets 108 and upon successful authentication get from the system servers 300 all needed customer user 101 details and mobile devices 400 associated with the customer user 101 to receive electronic tickets 108 as part of the electronic ticket 108 purchase workflow.

In some embodiments, the method 1200 may start 1201 and the ticket application 461 may present a user authentication screen to the user 101 on their mobile device 400 in block 1202. In block 1203, the user 101 may enter their details into their mobile device 400. In step 1204, the system server 300 may authenticate the user 101 preferably by matching the entered details with stored details or with a user name and password login. If the authentication is a success in decision block 1205, the ticket application 461 may authenticate the user 101 and return user 101 information and mobile devices 400 information in block 1206. If authentication is not successful, the ticket application 461 may display an unable to authenticate user screen on the mobile device 400 in block 1207. If the process is to be cancelled, such as by a selection from the user 101, in decision block 1208, the ticket application 461 may stop the method 1200 by being unable to authenticate the user 101 in block 1209. If the process is not to be cancelled, such as by a selection from the user 101, the method 1200 may continue to block 1202 and the user 101 may repeat the attempt to login.

Figure 13:
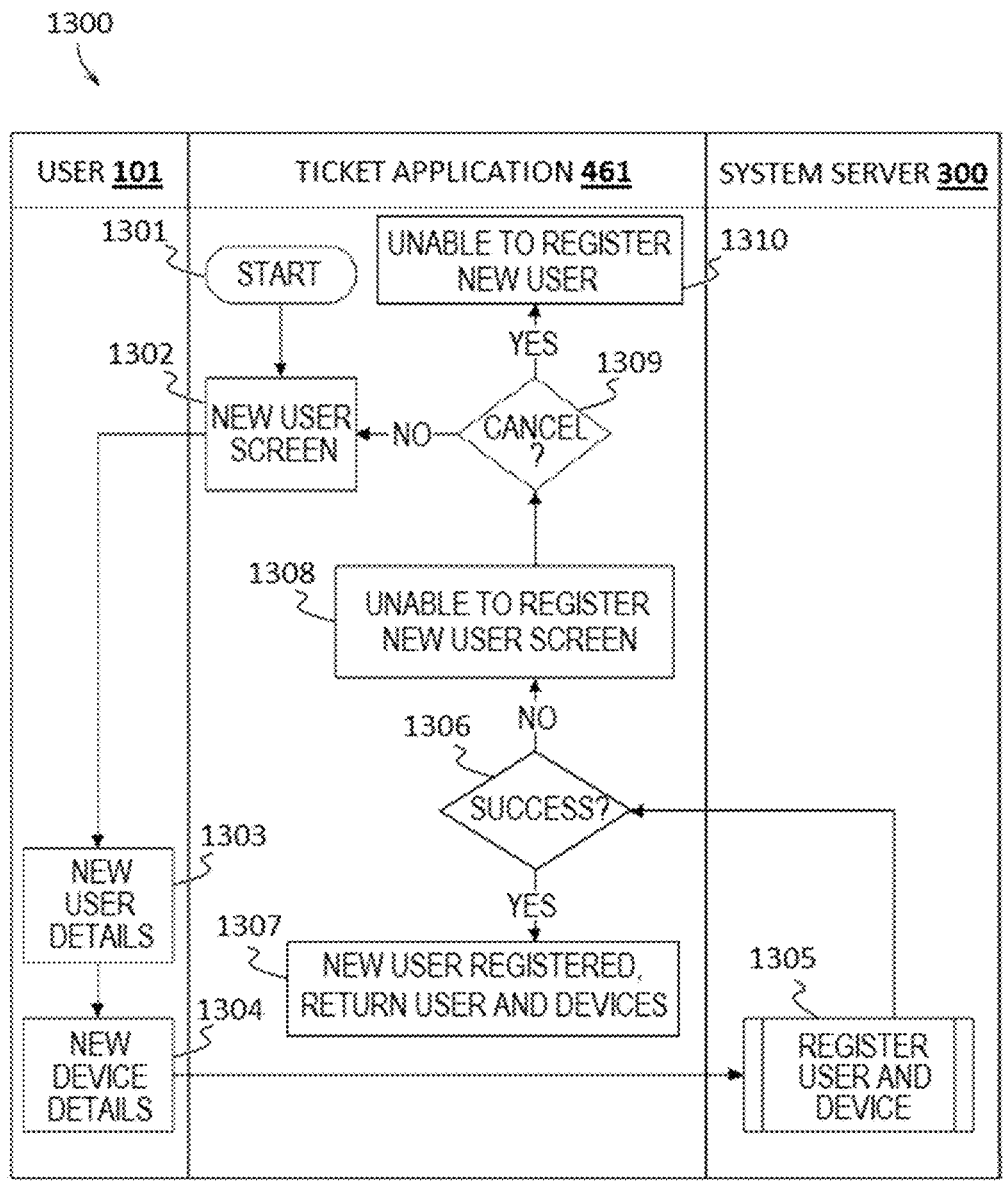
FIG. 13 depicts a flowchart of an example of a method for registering a new customer user between ticket application and system server according to various embodiments described herein

FIG. 13 shows an example of a method for registering a new customer user 101 between ticket application 461 and system server 300 ("the method") 1300 as part of a general electronic tickets 108 purchase workflow according to various embodiments described herein. The method 1300 may be used by the ticket application 461 to register a new customer user 101 and new mobile devices 400 of the user 101 for purchasing electronic tickets 108 and upon successful registration get from the system servers 300 all needed customer user 101 details and associated customer mobile devices 400 to receive electronic tickets 108 as part of the purchase workflow.

In some embodiments, the method 1300 may start 1301 and the ticket application 461 may present a user authentication screen to the user 101 on their mobile device 400 in block 1302. In block 1303, the user 101 may enter their user 101 details into their mobile device 400, and in block 1304, the user 101 may enter their details describing their mobile device 400 into their mobile device 400. In step 1305, the system server 300 may register the user 101 and their mobile device 400 in the system database 230. If the registration is a success in decision block 1306, the ticket application 461 may return user 101 information and mobile devices 400 information in block 1307. If registration is not successful, the ticket application 461 may display an unable to register user screen on the mobile device 400 in block 1308. If the process 1300 is to be cancelled, such as by a selection from the user 101, in decision block 1309, the ticket application 461 may stop the method 1300 by being unable to register the user 101 in block 1310. If the process 1300 is not to be cancelled, such as by a selection from the user 101, the method 1300 may continue to block 1302 and the user 101 may repeat the attempt to register.

Figure 14:
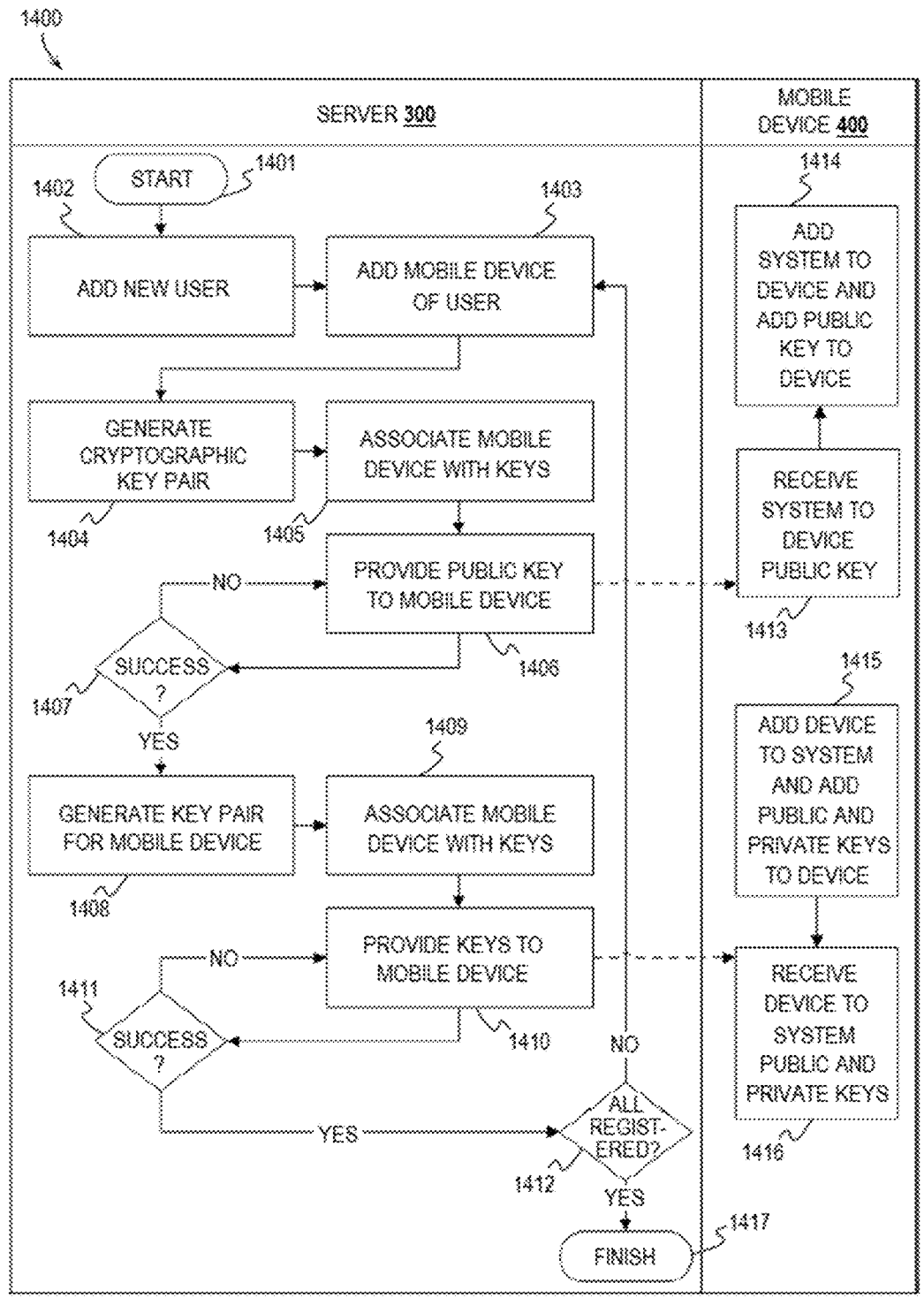
FIG. 14 shows a flowchart of an example of a method for registering a new customer user and customer mobile devices according to various embodiments described herein.

FIG. 14 illustrates an example of a method for registering a new customer user 101 and customer mobile devices 400 between system server 300 and the mobile device 400 ("the method") 1400 as part of a general purchase workflow that is an important part of the security of the system 100 as a whole according to various embodiments described herein. The system servers 300 may add to the system database 230 the new customer user 101 and new user mobile device 400 details in blocks 1402 and 1403, respectively. For each mobile device 400 to be registered, system servers 300 may generate two pairs of cryptographic asymmetric public/private key pairs in block 1404 and then update the system database 230 with both pairs for the new mobile device 400 in block 1405 for future use. In some embodiments, one key pair may be for system to mobile device 400 data exchange, and one pair may be for mobile device 400 to system data exchange.

The system server 300 subsequently downloads the public key only from the system to user 101 mobile device 400 key pair and the public/private keys from the mobile device 400 to system key pair to the mobile device 400 in blocks 1406 to 1416 thereby providing one or more cryptographic keys which may be used by the system to ensure secure communication between the system servers 300 and the mobile device 400.

In some embodiments, the mobile device 400 may store the three received keys on the mobile device 400 operating system 414 security keychain as part of security based best practices for mobile phone devices 400. In further embodiments, the mobile device 400 may store the three received keys in secure storage data store 408 on the mobile device 400 where only an authenticated application executing on the mobile device 400 may have access. In some embodiments, the system servers 300 and mobile device 400 can use RSA as an asymmetric cryptographic system of choice and use any of the SHA-X family of cryptographic hash functions for digital signatures or one-way hash values for security purposes. Therefore, whatever asymmetric cryptographic algorithm and hash function is used, as any may be used, both the system server 300 and mobile device 400 must use the same to fully understand each other and be fully secure for offline verification and redemption as will be discussed in FIG. 19.

As will be discussed in FIG. 16 the system servers 300 and mobile device 400 may use these generated public/private keys to create digital signatures of mobile device 400 identifiers and beacon device addresses, encryption/decryption of electronic tickets 108 or messages exchanged between system servers 300 and mobile devices 400 to advantageously maximize security.

Figure 15:
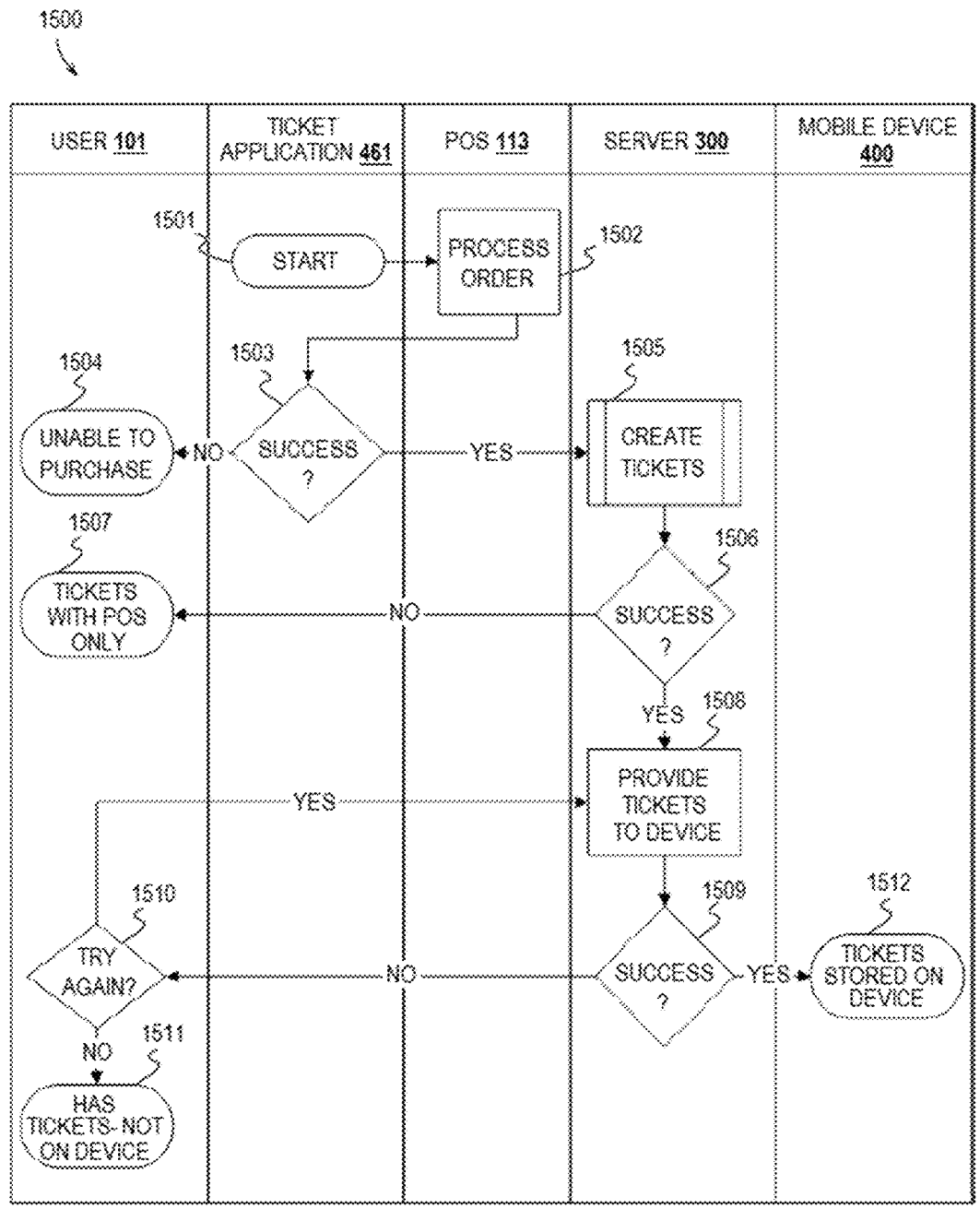
FIG. 15 illustrates a flowchart of an example of a method for the general purchase of an electronic ticket according to various embodiments described herein.

FIG. 15 illustrates an example of a method for the general purchase of an electronic ticket 108 ("the method") 1500 according to various embodiments described herein. The method 1500 may be used for the integration and coordination between major distributed system components such as the ticket application 461, POS system 113, and system servers 300 for the purpose of procuring electronic tickets 108 from POS 113 ticket inventory, having system servers 300 create and download electronic tickets 108 to the mobile device 400 while having the ticket application 461 providing feedback on the progress and final result of electronic ticket 108 creation.

In some embodiments of the method 1500 and as shown in FIG. 15, the ticket application 461 may integrate with both the POS system 113 and system server 300 directly. In other embodiments, the ticket application 461 may only integrate with the POS system 113 while the POS system 113 integrates with the system servers 300. In yet further embodiments, the ticket application 461 may only integrate with the system server 300 while the system server 300 integrates with the POS system 113. These embodiments illustrate the various ways the major distributed system components such as the ticket application 461, POS 113, and system servers 300 could be integrated for the creation and downloading of electronic tickets 108 to customer mobile devices 400 and stored in the electronic tickets database 421 for future offline verification and redemption purposes.

In some embodiments, the method 1500 may start 1501 and the pos system 113 may process an order for one or more tickets 108 in step 1502. If the ticket application 461 determines that the order was processed successfully, such as by receiving information describing the success from the POS 113, in decision block 1503, the server 300 may create the one or more electronic tickets 108 in step 1505. If the ticket application 461 determines that the order was not processed successfully, the ticket application 461 may display to the user 101 that they were unable to purchase the tickets 108 from the POS 113 in block 1504.

If the server 300 is not able to create the tickets in step 1505, the method 1500 may proceed from decision block 1506 to step 1507 and the user 101 may be informed on their mobile device 400 that the tickets 108 are only stored by the POS 113 and are not on the mobile device 400. If the server 300 is able to create the tickets in step 1505, the method 1500 may proceed from decision block 1506 to step 1508 and the server 300 may provide the tickets 108 to the mobile device 400 of the user 101. If the tickets 108 were successfully provided to the mobile device 400, the method 1500 may continue from decision block 1509 to step 1512 and the tickets 108 may be stored on the mobile device 400 such as in an electronic tickets database 421 on a data store 408. If the tickets 108 were not successfully provided to the mobile device 400, the method 1500 may continue from decision block 1509 to step 1510 and the user 101 may be queried to input into their mobile device 400 if they would like to try again in decision block 1510. If the user 101 input indicates that the user 101 would like to try again, the method 1500 may continue to step 1508. If the user 101 input indicates that the user 101 would not like to try again, the method 1500 may continue to step 1511 and the user 101 may be informed through their mobile device 400 that they have/purchased the tickets 108 but that the tickets 108 are not stored on their mobile device 400.

Figure 16:
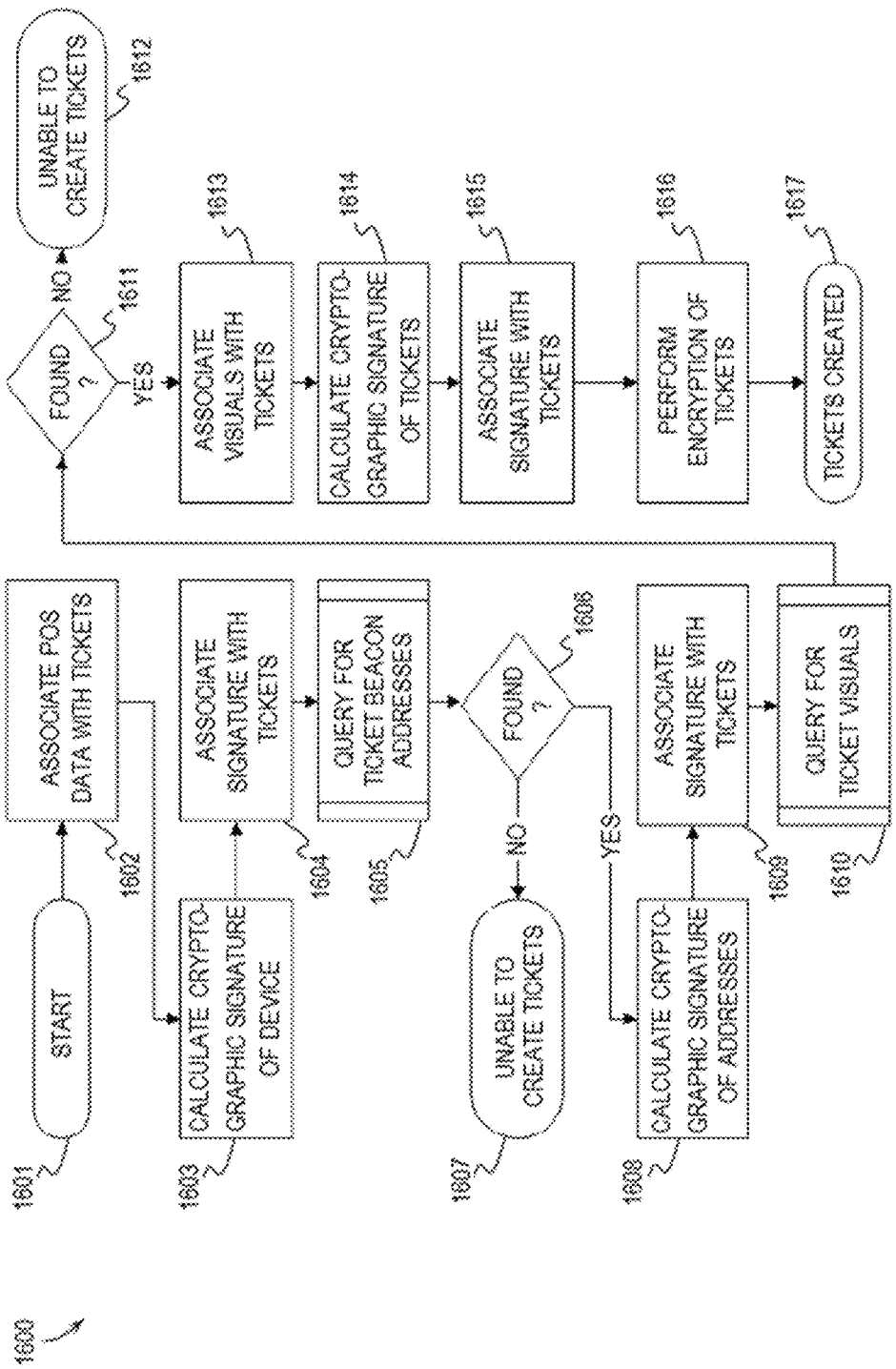
FIG. 16 depicts a flowchart of an example of a method for the creation of electronic tickets with the system server according to various embodiments described herein.

FIG. 16 illustrates an example of a method for the creation of electronic tickets 108 with the system server 300 ("the method") 1600 as part of the general electronic ticket 108 purchase workflow according to various embodiments described herein. The method 1600 may be used by the system server 300 to create electronic tickets 108 that may be composed of the parts previously discussed in FIG. 10 for the electronic ticket 108 data model such as the POS ticket data 235, ticket device identifier 236, ticket beacon address 241, and the visual ticket data 239 used for presentation of the electronic ticket 108 on the mobile device 400.

Security of the electronic ticket 108 may be realized by the use of cryptography. In some embodiments, the allowable customer device identifier 234 and beacon addresses 237 are not directly stored in the electronic ticket 108 but indirectly stored by storing their cryptographic asymmetric digital signatures used for matching purposes on the mobile device 400 as will be discussed in FIG. 25, FIG. 26, and FIG. 27. In other embodiments, a cryptographic asymmetric digital signature of the electronic ticket 108 itself may be generated and stored directly in the electronic ticket 108 on the mobile device 400 and upon receiving an electronic ticket 108 the ticket application 461 can verify the digital signature of the electronic ticket 108 to know it was created by the system server 300 and not by some malicious party. These digital signatures may be generated and verified by the system to device public/private keys as discussed in FIG. 14. In yet further embodiments, the electronic ticket itself is protected from unauthorized reading as the electronic ticket may be encrypted/decrypted by the device to system public/private keys as discussed in FIG. 14 so only the system server 300 and customer mobile device 400 can decrypt and read the electronic ticket 108 and its associated data as needed.

In some embodiments, the method 1600 may start 1601 and POS 113 data may be associated with the one or more electronic tickets 108 by the POS system 113 and/or server 300 in step 1602. In step 1603, the cryptographic asymmetric digital signature of the device identifier 234 of mobile device 400 of the user 101 that purchased the one or more tickets 108 may be calculated by the POS system 113 and/or server 300. Next, the digital signature may be associated with the tickets 108 by the POS system 113 and/or server 300 as a ticket device identifier 236 in step 1604. In step, 1605, the POS system 113 and/or server 300 may query the system database 230 for Beacon Addresses 237 associated with the electronic tickets 108.

If the Beacon Addresses 237 are not found, the method 1600 may proceed from decision block 1606 to step 1607 and the electronic tickets 108 may be unable to be created due to the missing beacon configuration. If the Beacon Addresses 237 are found, the method 1600 may proceed from decision block 1606 to step 1608 and the POS system 113 and/or server 300 may calculate cryptographic asymmetric digital signatures of the found beacon addresses 237 in step 1608. These calculated signatures may then be associated with the electronic tickets 108 in the system database 230 in step 1609 as a ticket beacon address 241. In step 1610, the POS system 113 and/or server 300 may query the system database 230 for the ticket visual data 242 or visuals. If the visual data 242 is not found, the method 1600 may continue from decision block 1611 to step 1612 and the system 100 may be unable to create the electronic tickets 108 due to the missing visual data 242 which is used to create the graphical representation of the electronic tickets 108 on the mobile device 400.

If the visual data 242 is found, the method 1600 may continue from decision block 1611 to step 1613 and the POS system 113 and/or server 300 may associate the visual data 242 with the electronic tickets 108 in the system database 230. In step 1614, the POS system 113 and/or server 300 may calculate cryptographic asymmetric digital signature of the electronic tickets 108. The cryptographic asymmetric digital signature may then be associated with the electronic tickets 108 in the system database 230 by the POS system 113 and/or server 300 in step 1615. Next in step 1616, the POS system 113 and/or server 300 may cryptographic asymmetric digital signature of the electronic tickets 108 and their associated data to result in the creation of the electronic tickets 108 to be sent to the mobile device 400 of the user 101 in step 1617.

Figure 17:
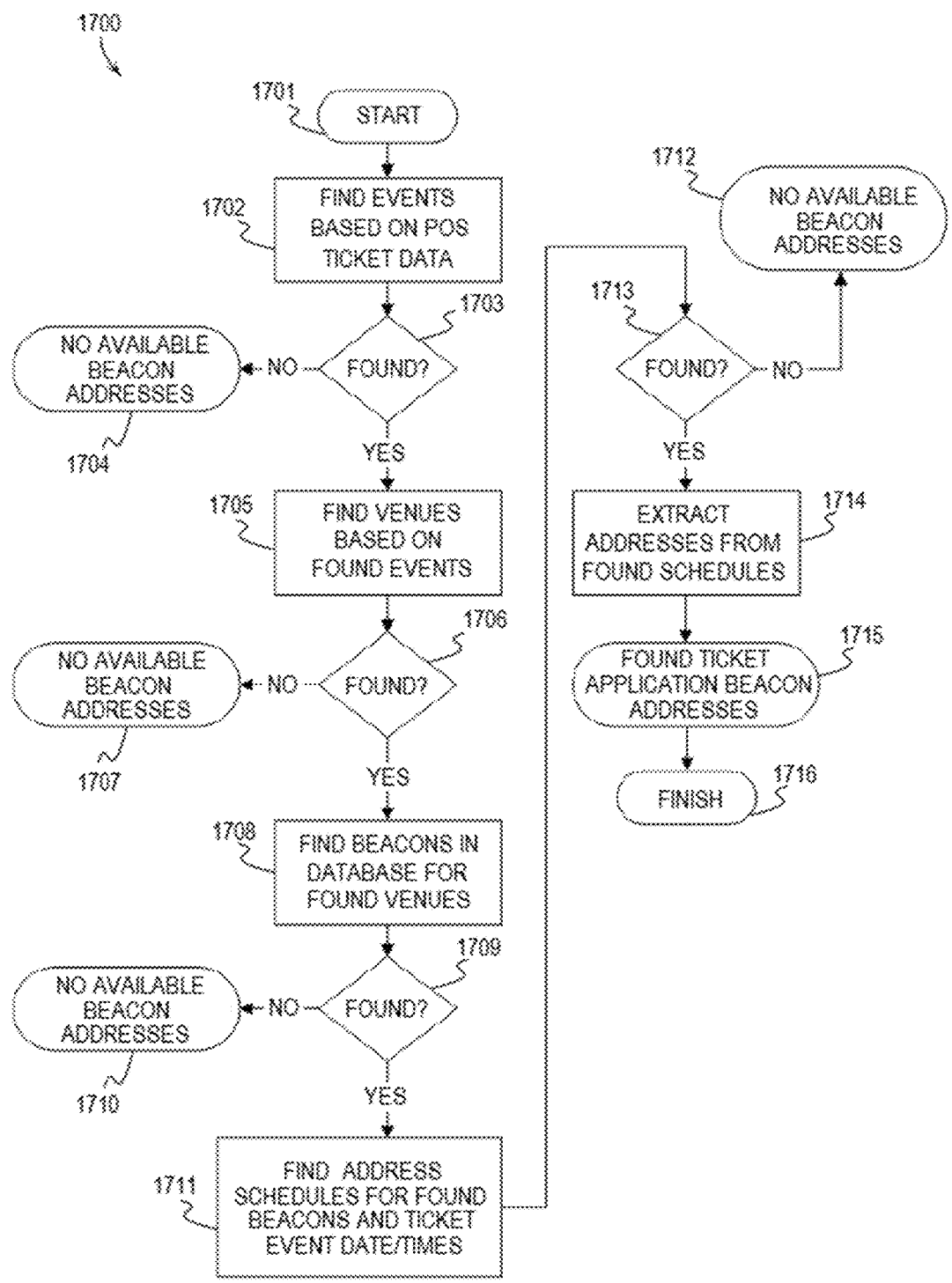
FIG. 17 shows an example method for querying for electronic ticket beacon addresses as part of a general electronic ticket purchase workflow according to various embodiments described herein.

FIG. 17 shows an example method for querying for electronic ticket beacon addresses as part of a general electronic ticket 108 purchase workflow ("the method") 1700 according to various embodiments described herein. The method 1700 may be used by the system server 300 to query the system database 230 for allowable beacon addresses 237 associated with an electronic ticket 108 based on the date/time of the event and venue to be used for electronic ticket 108 creation as discussed in FIG. 16.

In some embodiments, the method 1700 may start 1701 and the server 300 may find events 232 in the system database 230 based on POS system 113 ticket data 235 in step 1702. If the data is not found, the method 1700 may continue from decision block 1703 to step 1704 and the method 1700 may terminate due to no available beacon addresses 237 due to this missing events configuration. If the data is found, the method 1700 may continue from decision block 1703 to step 1705 and the server 300 may find venues 233 in the system database 230 based on the found events 233 data. If the data is not found, the method 1700 may continue from decision block 1706 to step 1707 and the method 1700 may terminate due to no available beacon addresses 237 due to this missing venue 233 configuration. If the data is found, the method 1700 may continue from decision block 1706 to step 1708 and the server 300 may find beacon devices 450 in the system database 230 based on the found venues 233 data.

If the data is not found, the method 1700 may continue from decision block 1709 to step 1710 and the method 1700 may terminate due to no available beacon device 450 configuration. If the data is found, the method 1700 may continue from decision block 1709 to step 1711 and the server 300 may find beacon address schedules 238 in the system database 230 for the found beacon devices 450 and the electronic ticket 108 event date and time. If the data is not found, the method 1700 may continue from decision block 1713 to step 1712 and the method 1700 may terminate due to missing or no available beacon address 238 configuration. If the data is found, the method 1700 may continue from decision block 1713 to step 1714 and the server 300 may extract beacon addresses 237 found with the beacon address schedules 238 in the system database 230. Once the applicable beacon addresses 237 for the electronic ticket 108 are found in step 1715, the method 1700 may finish 1716.

Figure 18:
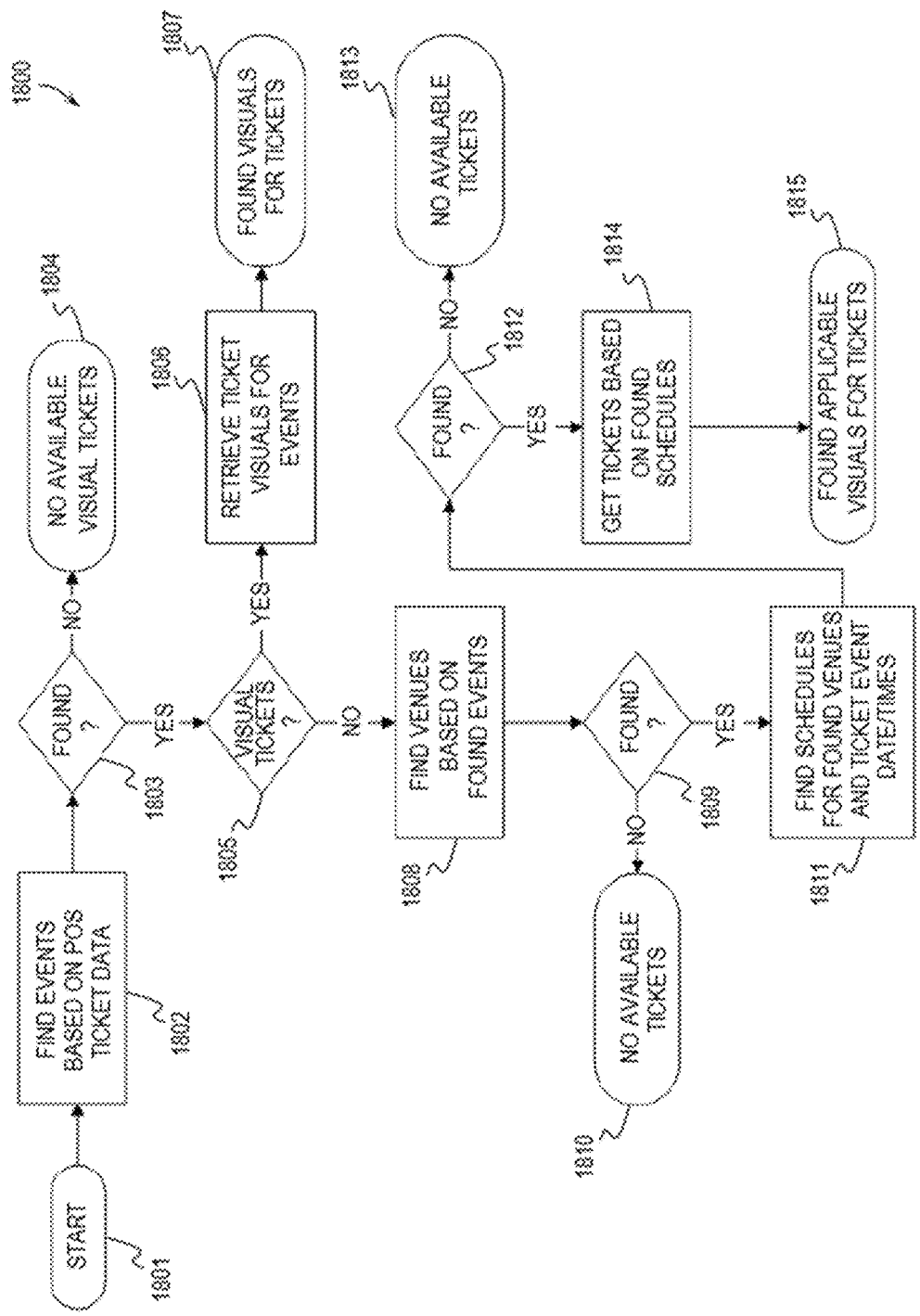
FIG. 18 illustrates a flowchart of an example method for querying of visual ticket data for an electronic ticket as part of a general electronic ticket purchase workflow according to various embodiments described herein

FIG. 18 depicts an example of a method for the querying of visual ticket data 239 for an electronic ticket 108 as part of a general electronic ticket 108 purchase workflow ("the method") 1800 according to various embodiments described herein. The method 1800 may be used by the system server 300 to query the system database 230 for the visual ticket data 239 based on the date/time of the event and venue to be used for presentation purposes on the mobile device 400 for electronic ticket 108 graphical creation as discussed in FIG. 16

In some embodiments, the method 1800 may start 1801 and the system server 300 may find events 232 in the system database 230 based on POS ticket data 235 in step 1802. If the data is not found, the method 1800 may continue from decision block 1803 to step 1804 and the method 1800 may terminate due to no available visual ticket data 239 from a lack of events 232 data configuration in the system database 230. If the data is found, the method 1800 may continue from decision block 1803 to decision block 1805 and the system server 300 may determine if the event 232 has visual ticket data 239. If the data is found, the method 1800 may continue from decision block 1805 to step 1806 and the server 300 may retrieve visual ticket data 239 from the system database 230 based on the visual data 242 which makes up the visual ticket data 239 that is associated with the event 232 resulting in the visual ticket data 239 being found for the electronic tickets 108 in step 1807.

If the data is not found, the method 1800 may continue from decision block 1805 to step 1808 and the server 300 may find venues 233 in the system database 230 based on the found events 232. If the data is not found, the method 1800 may continue from decision block 1809 to step 1810 and the method 1800 may terminate due to no available visual ticket data 239 from a lack of venue 233 data configuration in the system database 230. If the data is found, the method 1800 may continue from decision block 1809 to step 1811 and the server 300 may find visual ticket data 239 in the system database 230 based on the found venue 233 and electronic ticket 108 event 232 date and time. If the data is not found, the method 1800 may continue from decision block 1812 to step 1813 and the method 1800 may terminate due to no available visual ticket data 239 from a lack this data configuration in the system database 230. If the data is found, the method 1800 may continue from decision block 1812 to step 1814 and the server 300 may retrieve visual ticket data 239 from the system database 230 based on the visual data 242 which makes up the visual ticket data 239 that is associated with the event 232 resulting in the visual ticket data 239 being found for the electronic tickets 108 in step 1815.

Figure 19:
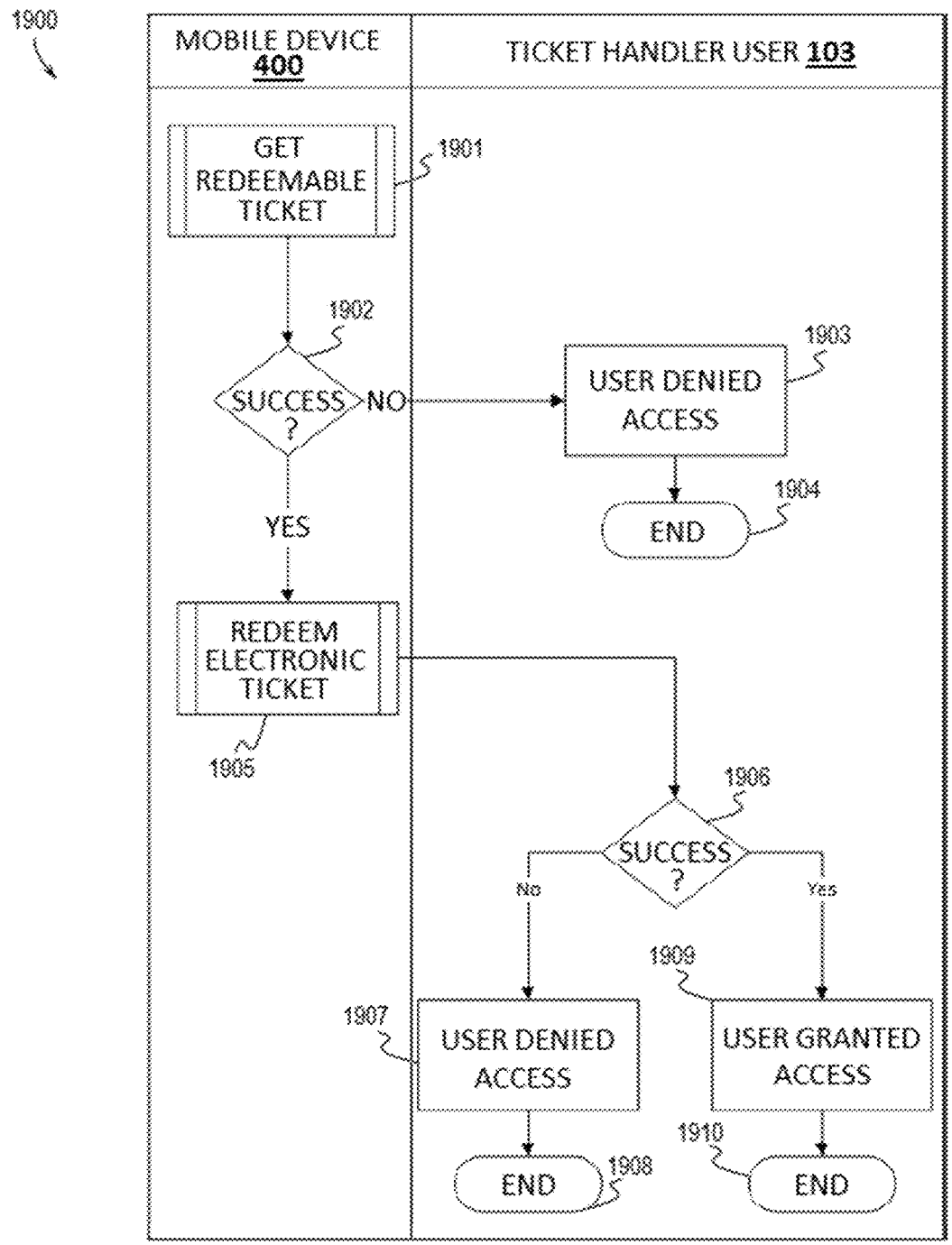
FIG. 19 depicts a flowchart of an example method for offline electronic ticket verification and redemption according to various embodiments described herein.

Turning now to FIGS. 19-27 example methods for Offline Verification and Redemption of electronic tickets 108 are provided. FIG. 19 illustrates an example method for the offline electronic ticket 108 verification and redemption on a mobile device 400 of a customer user 101 ("the method") 1900 according to various embodiments described herein. The method 1900 may be performed to show how the customer user 101, mobile device 400, beacon device 450, and ticket handler user 103 may interact to realize the offline verification and redemption of an electronic ticket 108 visually by the ticket handler 103 for access to the purchased event where the term "offline" means that the mobile device 400 does not need to communicate with any other electronic device or system server 300 resulting in an efficient and pleasant event entry experience for the customer user 101.

In some embodiments, a method 1900 for offline electronic ticket 108 verification and redemption on a mobile device 400 of a user 101 may comprise two general or overall steps. In the first step 1901, the electronic ticket 108 may be retrieved from an electronic tickets database 421 and displayed on the display screen 404A of the mobile device 400 by the ticket application 461. In some embodiments, the mobile device 400 may retrieve or get a redeemable 206 electronic ticket 108 for offline verification and redemption purposes based on user 101 input and/or detected beacon device 450 addresses. As will be discussed in FIG. 20 and FIG. 21 respectively there may be two common ways a mobile device 400 can get a redeemable electronic ticket 108: a) Automatic Ticket Selection by Beacon device 450 communication, or b) Manual Ticket Selection by User 101.

If the mobile device 400 was able to get a redeemable electronic ticket 108 then the method 1900 may continue to the second overall step of redeeming the electronic ticket 108 in step 1905. Otherwise, the method 1900 may continue from decision block 1902 to step 1903 the mobile device 400 may be unable to get a redeemable 206 electronic ticket 108 and the customer user 101 may be denied access to the ticketable product or service by the ticket handler 103 and the method 1900 ends 1904. If the ticket 108 is retrieved, the ticket 108, as displayed on the mobile device 400, may be presented the ticket handler 103 who is able to visually verify the customer user 101 should be denied access based on the visual presentation of the electronic ticket in the locked state in step 1907 and the method 1900 may also end 1908. FIG. 7 depicts an example of an electronic ticket 108 that is in the locked 205 state while FIG. 8 shows an example of an electronic ticket 108 in the redeemable 206 state.

In the second overall step of the method 1900, the mobile device 400 may redeem the selected electronic ticket 108 from the first overall step 1901. As will be discussed in FIG. 22, FIG. 23, and FIG. 24 respectively there may be three common ways a mobile device 400 may redeem an electronic ticket 108: a) Automatic Redemption by Beacon (1 Beacon embodiment); b) Automatic Redemption by Beacon (2 Beacon embodiment); or c) Manual Redemption by a user such as a customer user 101 and/or ticket handler user 103.

If the mobile device 400 was able to redeem an electronic ticket 108 in decision block 1906 then the user 101 may be granted access to the ticketable product or service in step 1909 by the ticket handler 103 and the method 1900 ends 1910. Otherwise the mobile device 400 was unable to redeem an electronic ticket 108 and the user 101 may be denied access to the ticketable product or service by the ticket handler 103 in step 1907 and the method 1900 ends 1908. In some embodiments, the ticket handler 103 may be able to visually verify the mobile device 400 redeemed the electronic ticket 108 based on the visual presentation of the electronic ticket 108 in the redeemed 210 state on the display screen of the mobile device 400. FIG. 9 shows an example of an electronic ticket 108 that is in the redeemed 210 state.

Figure 20:
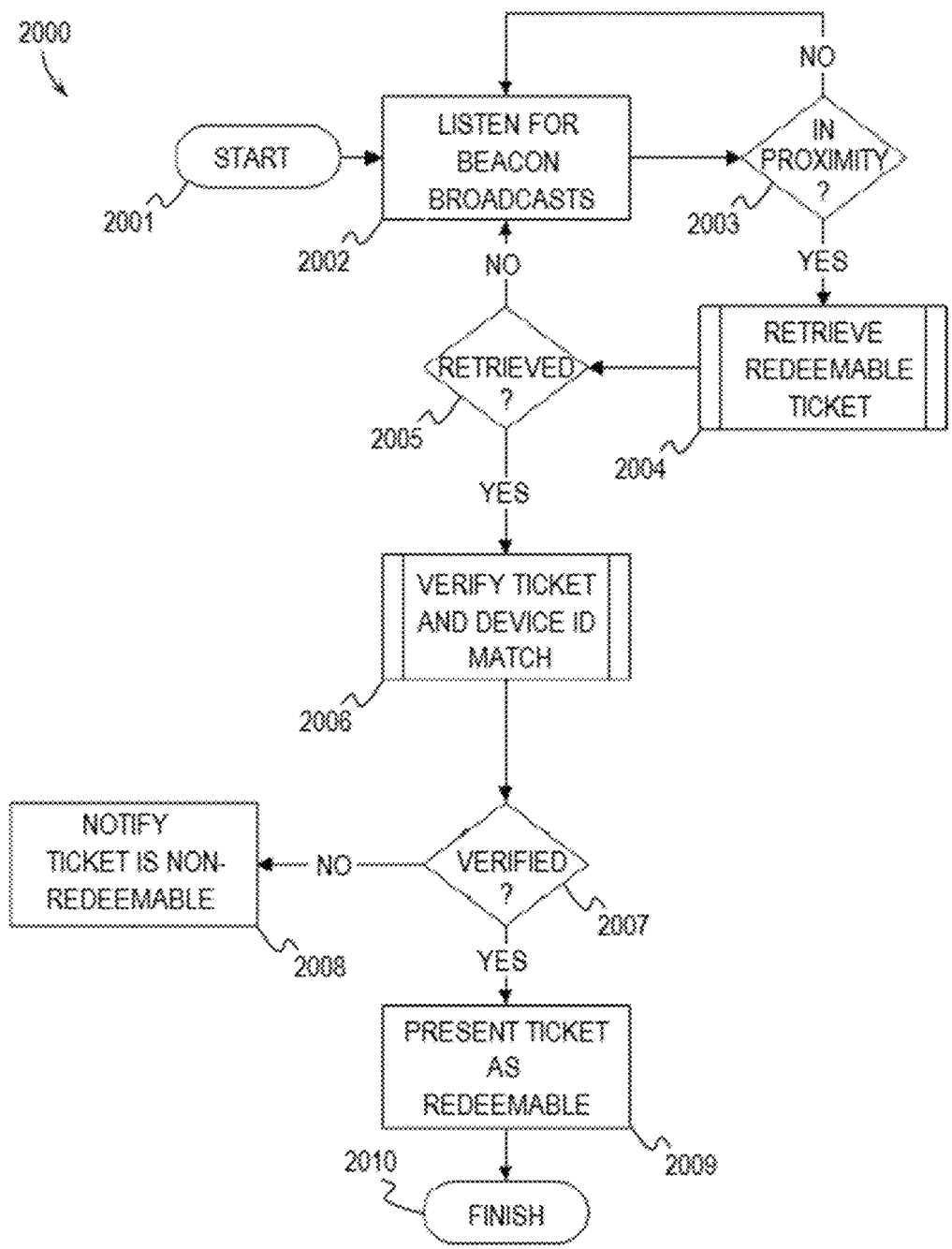
FIG. 20 shows a flowchart of an example method for the retrieval of a redeemable electronic ticket via automatic ticket selection by the detection of a beacon device according to various embodiments described herein.

FIG. 20 illustrates an example of a method for the retrieval of one or more redeemable 206 electronic tickets 108 via automatic ticket selection by the detection of a beacon device 450 ("the method") 2000 as part of the offline electronic ticket verification and redemption method 1900 workflow according to various embodiments described herein. The method 2000 may be used to enable the mobile device 400, after authenticated the customer user 101, such as by password credentials or device credentials, and upon successful authentication listen for smart beacon device 450 broadcasts of beacon addresses 237 in step 2002.

In some embodiments, the method 2000 may begin 2001 and the mobile device 400 running a ticket application 461 will monitor the radio 406 of the mobile device 400 in step 2002 for any detectable beacon device 450 broadcasts which contain a beacon address 237 unique and for that beacon device 450. Once the mobile device 400 is in-proximity of a smart beacon device 450, so as to be within wireless communication 106 with the beacon device 450, by receiving a beacon address 237, the mobile device 400 may try and find or retrieve a redeemable 206 electronic ticket(s) 108 in step 2004 in the electronic ticket database 421 on the mobile device 400 as will be discussed in FIG. 25 respectively. If the mobile device 400 could not find any redeemable electronic tickets 108 it keeps listening for other smart beacon device broadcasts from decision block 2003 to step 2002.

Once the mobile device 400 has retrieved a locked 205 electronic ticket 108 based upon the received beacon address 237 of the beacon device 450 in step 2004, the mobile device 400 may verify the electronic ticket 108 and current mobile device 400 identifiers 234 match in step 2006 as will be discussed in FIG. 26 respectively. If the electronic ticket 108 and current device identifiers 234 do not match, the method 2000 may continue from decision block 2007 to step 2008 and the ticket application 461 running on the mobile device 400 may notify the user 101 that the electronic ticket 108 is non-redeemable on their mobile device 400 and the method 200 ends with device ticket mismatch. Otherwise the electronic ticket 108 and current mobile device 400 identifiers 234 match and the mobile device 400 displays or presents the electronic ticket 108 as redeemable 206 in step 2009 and the method 2000 may finish 2010. FIG. 8 shows an example of a mobile device 400 displaying or presenting an electronic ticket 108 as redeemable 206.

Figure 21:
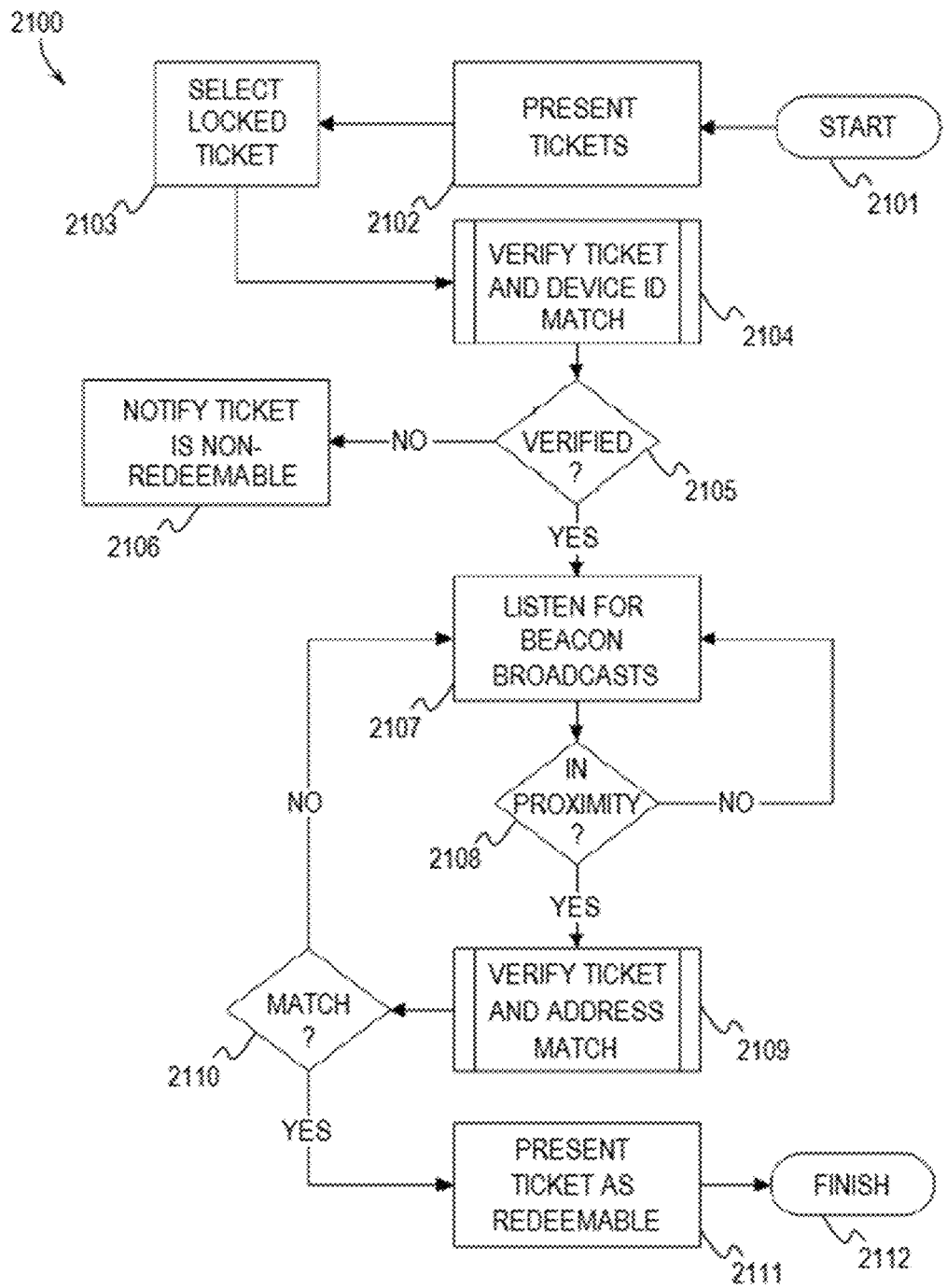
FIG. 21 illustrates a flowchart of an example method for retrieving a redeemable electronic ticket via manual ticket selection by a user according to various embodiments described herein.

FIG. 21 shows an example of a method for retrieving a redeemable 206 electronic ticket 108 via manual ticket selection by user 101 ("the method") 2100 which may be part of the offline electronic ticket verification and redemption method 1900 according to various embodiments described herein. The method 2100 may be performed by the ticket application 461 running on the mobile device 400, preferably once the user 101 and their mobile device 400 has been authenticated, such as by password credentials or device credentials, and upon successful authentication, present one or more locked 205 electronic tickets 108 on the display screen of the mobile device 400 in step 2102 preferably for the customer user 101 to select a locked 205 electronic ticket 108 for offline verification and redemption purposes.

In step 2103 the customer may select a locked 205 electronic ticket 108 on their mobile device 400, the ticket application 461 may verify the ticket device identifier 236 of the electronic ticket 108 and current mobile device identifiers 234 of the mobile device 400 match in step 2104 as will be discussed in FIG. 26 respectively. If the ticket device identifier 236 of the electronic ticket 108 and current device identifiers 234 do not match, the method 2100 may continue from decision block 2105 to step 2106 and the ticket application 461 may use the display screen of the mobile device 400 to notify the user 101 that the electronic ticket 108 is non-redeemable on the current mobile device 400 and the method may end with device ticket mismatch in step 2106. Otherwise, the method 2100 may continue from decision block 2105 and the selected locked 205 electronic ticket 108 and current device identifiers 234 do match and the ticket application 461 may use the radio 406 of the mobile device 400 to listen for smart beacon device 450 broadcasts, containing the beacon address 237 of a beacon device 450 in step 2107.

Once the mobile device 400 is in-proximity of a smart beacon device 450 by receiving a beacon address 237 the ticket application 461 on the mobile device 400 may verify the ticket beacon address 241 of the electronic ticket 108 and received beacon address 237 in step 2109 and decision block 2110 match as will be discussed in FIG. 27 respectively. If the received beacon address 237 does not match any redeemable type ticket beacon address 241 of the for the selected locked electronic ticket 108, the method 2100 may continue to step 2107 and the mobile device 400 keeps listening for other smart beacon device 450 broadcasts. Once the ticket application 461 on the mobile device 400 has verified the electronic ticket 108 and received beacon address 237 match, the ticket application 461 may present the electronic ticket 108 as redeemable 206 on the display screen of the mobile device 400 in step 2111 and the method 2100 may finish 2112. FIG. 8 shows an example of a mobile device 400 presenting an example of an electronic ticket 108 as redeemable 206.

Figure 22:
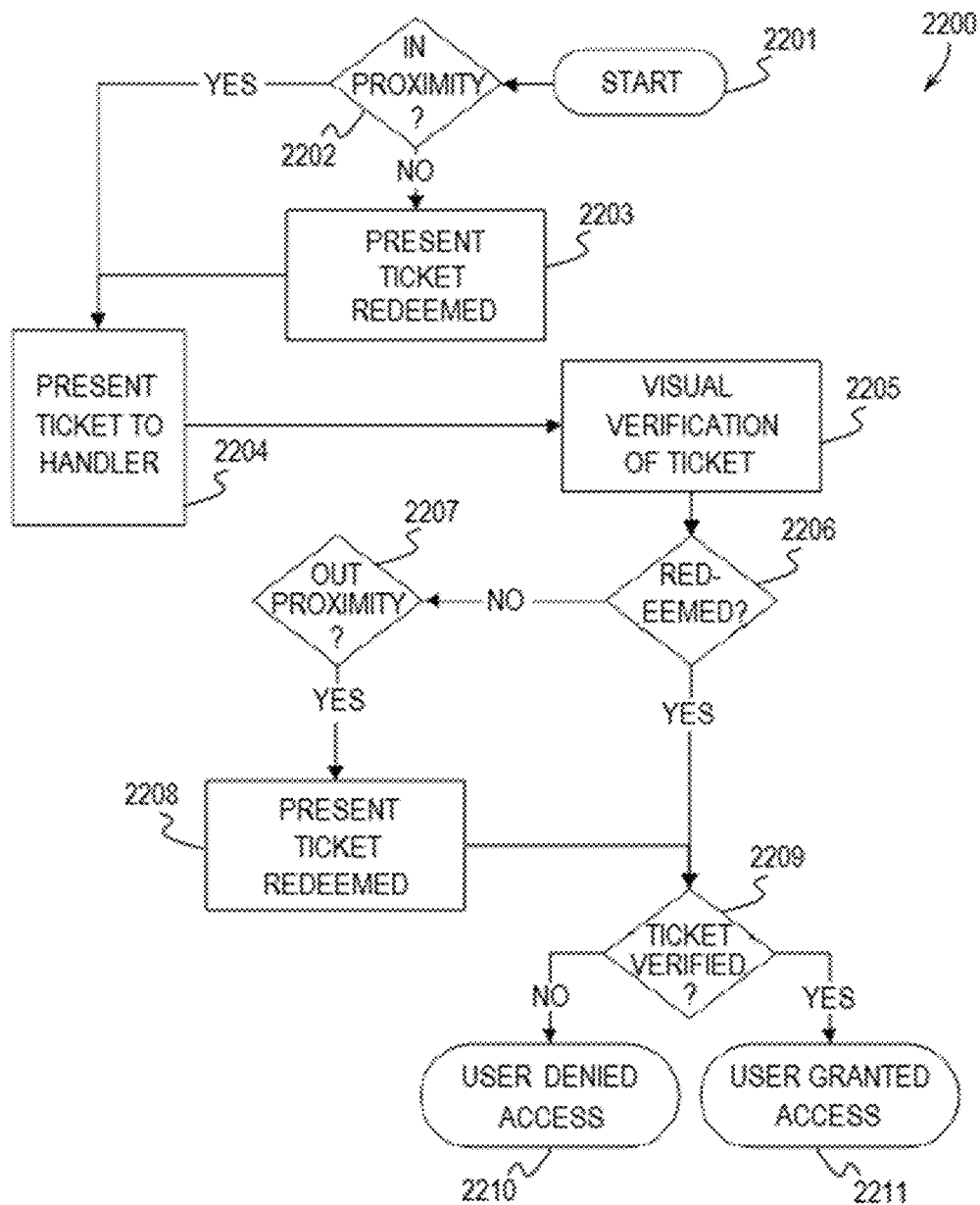
FIG. 22 depicts a flowchart of an example method of redeeming an electronic ticket via automatic redemption by a single beacon device system embodiment according to various embodiments described herein.

FIG. 22 illustrates an example of a method for redeeming an electronic ticket 108 via automatic redemption by a single beacon device 450 system 100 embodiment, as shown in FIG. 3, ("the method") 2200 as part of the offline electronic ticket verification and redemption according to various embodiments described herein. The method 2200 may be used to enable a mobile device 400 to redeem a currently redeemable 206 electronic ticket 108 by a customer user 101 presenting the redeemable 206 or already redeemed 207 electronic ticket 108 on the display screen of their mobile device 400 to a ticket handler 103 who may visually verify the electronic ticket 108 and subsequently the user 101 may be denied or granted access to the ticketable product or service by the ticket handler 103 based on the visual verification.

In some embodiments, the method 2200 may start 2201 and the ticket application 461 may detect if the mobile device 400 is in proximity to the beacon device 450 in decision block 2202. If the mobile device 400 is not in proximity, the method 2200 may continue to step 2203 and a redeemed 207 electronic ticket 108 may be displayed, preferably persisted as redeemed 207, on the mobile device 400. If the mobile device 400 is in proximity to a beacon device 450, the ticket application 461 may display an electronic ticket 108 associated with the beacon address 237 of the beacon device 450 on the mobile device 400 to be viewed by the ticket handler 103. The ticket handler 103 may visually verify, such as by observing the displayed electronic ticket 108 on the mobile device 400, in step 2205. In decision block 2205, the ticket handler 103 may determine if the electronic ticket 108 has been redeemed. If the ticket 108 has been redeemed, the method 2200 may continue to decision block 2209 and the ticket handler 103 may determine if the electronic ticket 108 has passed verification, such as by observing if the ticket is for the current event that the handler 103 is staffing. If the ticket 108 does not pass verification, the user 101 may be denied access to the event in step 2210 by the ticket handler 103. If the ticket 108 does pass verification, the user 101 may be allowed access to the event in step 2211 by the ticket handler 103.

Once the mobile device 400 displaying the electronic ticket 108 goes out-of-proximity of the beacon device 450 that caused the electronic ticket 108 to become redeemable on the mobile device 400 in decision block 2207, the electronic status of the ticket 108 may be persisted as redeemed in the local electronic tickets database 421 on the mobile device 400 and the ticket application 461 may present or display the electronic ticket 108 on the display of the mobile device 400 as redeemed 207 in step 2208. FIG. 9 shows an example of a mobile device 400 presenting or displaying an example of an electronic ticket 108 as redeemed 207.

Figure 23:
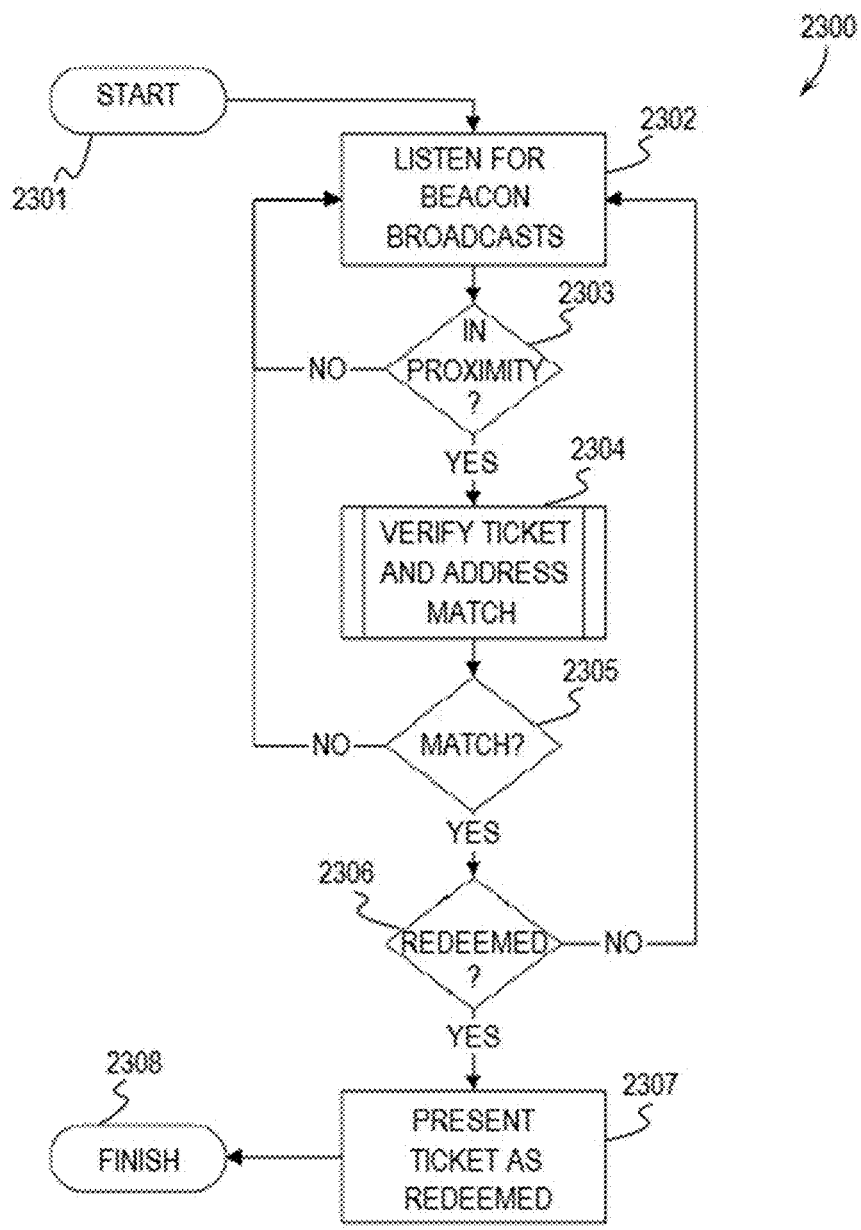
FIG. 23 shows a flowchart of an example method of redeeming an electronic ticket via automatic redemption by beacon by a two beacon device system according to various embodiments described herein.

FIG. 23 illustrates an example of a method for redeeming an electronic ticket 108 via automatic redemption by a two beacon device 450 system 100 embodiment ("the method") 2300 as part of an offline electronic ticket verification and redemption workflow according to various embodiments described herein. The method 2300 may be used to enable a mobile device 400 to redeem a currently redeemable 206 electronic ticket 108 that was made redeemable by a first beacon device 450A (FIG. 5) and which may subsequently listen for beacon broadcasts from a second beacon device 450B (FIG. 5).

In some embodiments, the method 2300 may start 2301 and the ticket application 461 may use the radio 406 of the mobile device 400 to listen for second beacon device 450B broadcasts containing beacon addresses 237 in step 2302. If not in proximity, the method 2300 may continue from decision block 2303 to step 2302. Once the mobile device 400 is in-proximity of a second beacon device 450B by receiving a beacon address 237, the method 2300 may continue from decision block 2303 to step 2304 and the ticket application 461 of the mobile device 400 must verify that the electronic ticket 108 and received beacon address 237 match as will be discussed in FIG. 27 respectively. If the received beacon address 237 does not match any redeemed 207 typed beacon addresses 237 for the selected redeemable 206 electronic ticket 108, the method 2300 may continue from decision block 2306 to step 2302 and the ticket application 461 may use the radio 406 of the mobile device 400 to keep listening for other smart beacon device 450 broadcasts. Once the mobile device 400 has verified the electronic ticket 108 and received beacon address 237 match and the beacon address 237 is a redeemed 207 type of beacon address 450, the method 230 may continue from decision block 2305 to decision block 2306 and the ticket application 461 of the mobile device 400 may persist the electronic status of the ticket 108 as redeemed 207 in the local electronic tickets database 421 on the mobile device 400 and the ticket application 461 may display or present the electronic ticket 108 as redeemed 207 in step 2307 and the method 2300 may finish 2308. FIG. 8 shows an example of a mobile device 400 presenting an example electronic ticket 108 as redeemable 206. Once the redeemable 206 electronic ticket 108 becomes redeemed 207, the customer user 101 presents the redeemed 207 electronic ticket 108 displayed on the mobile device 400 to the ticket handler 103 who visually verifies the electronic ticket 108 and subsequently the user 101 is denied or granted access to the ticketable product or service by the ticket handler 103 based on the visual verification. FIG. 9 shows an example of a mobile device 400 presenting an electronic ticket 108 as redeemed 207.

Figure 24:
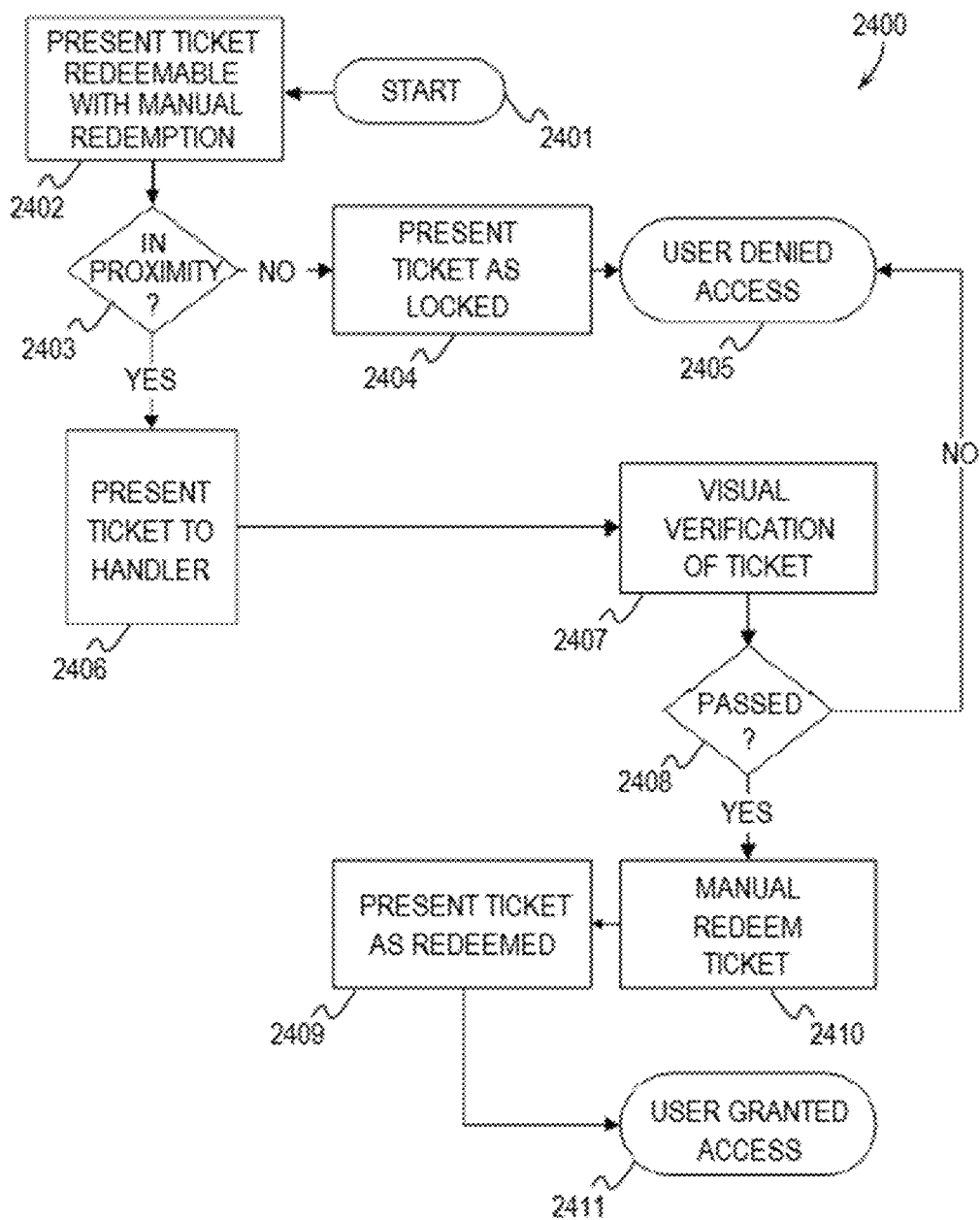
FIG. 24 illustrates a flowchart of an example method of redeeming an electronic ticket via manual redemption by a user according to various embodiments described herein.

FIG. 24 illustrates an example of a method for redeeming an electronic ticket 108 via manual redemption by a user ("the method") 2400 as part of the offline electronic ticket verification and redemption workflow according to various embodiments described herein. The method 2400 may be used to enable a customer user 101 to redeem a currently redeemable 206 electronic ticket 108. In some embodiments, the method 2400 may start 2401 and the ticket application 461 may display or present the redeemable 206 electronic ticket 108 with manual redemption in step 2402 on the mobile device 400. If the mobile device 400 is in proximity of a beacon device 450, the method 2400 may continue from decision block 2403 to step 2406 with the customer user 101 presenting the redeemable 206 ticket 108 with manual redemption cues or already redeemed 207 electronic ticket 108 on the mobile device 400 to the ticket handler 103 who visually verifies the electronic ticket 108 in step 2407.

If the mobile device 400 is not in proximity of the beacon device 450 that caused the electronic ticket 108 to become redeemable, the method 2400 may continue from decision block 2403 to step 2404 and the ticket application 461 of the mobile device 400 may present the electronic ticket 108 as locked 205 or if the electronic ticket failed visual verification by the ticket handler 103, the customer user may be denied access to the ticketable product or service by the ticket handler 103 in step 2405. FIG. 8 is an example of a redeemable electronic ticket 108 where manual redemption is required. If the electronic ticket 108 passes visual verification, the method 2400 may continue from decision block 2408 to step 2410, and subsequently the customer user 101 and/or ticket handler 103 must manually redeem the redeemable electronic ticket 108 so the customer user 101 is granted access to the ticketable product or service by following the manual redemption cues being presented on the customer device 400. Once the current electronic ticket 108 on the mobile device 400 is manually redeemed the mobile device 400 in step 2410 the ticket application 461 may save the electronic status of the ticket 108 as redeemed 207 in the local electronic tickets database 421 on the mobile device 400 and the ticket application 461 may also present or display the electronic ticket 108 as redeemed 207 on the mobile device 400 in step 2409 to enable the ticket handler 103 to grant the user 101 access to the event in step 2411. FIG. 9 shows an example of a mobile device 400 presenting an example of an electronic ticket 108 as redeemed 207.

Figure 25:
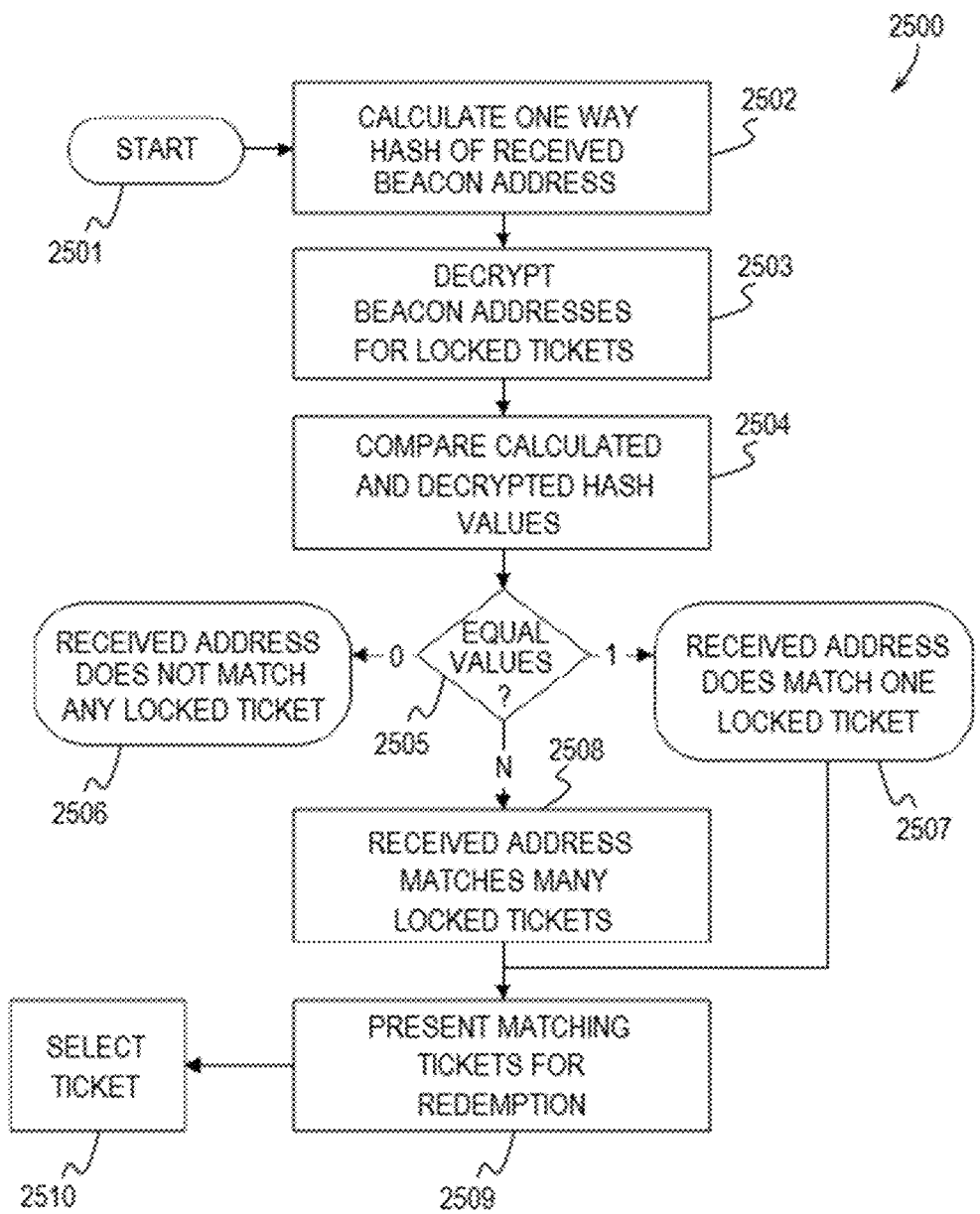
FIG. 25 depicts a flowchart of an example method of for retrieving a redeemable electronic ticket from received the electronic tickets database of a mobile device based on a received beacon address according to various embodiments described herein.

FIG. 25 illustrates an example of a method for retrieving a redeemable electronic ticket 108 from the electronic tickets database 421 of a mobile device 400 based on a received beacon address ("the method") 2500 as part of the offline electronic ticket verification and redemption workflow according to various embodiments described herein. The method 2500 may enable the use of cryptography to find locked electronic tickets 108 that are redeemable on a mobile device 400 based on a received beacon address 237 from a beacon device 450.

In some embodiments, the method 2500 may start 2501 and the ticket application 461 on the mobile device 461 may calculate a one-way hash value of the received beacon address 237 in step 2502 by using the same cryptographic one-way hash function and encryption algorithm the system server 300 used when creating the electronic ticket 108. Next, the ticket application 461 may decrypt the digital signatures of the ticket beacon address 241 for locked 205 electronic tickets 108 in step 2503. In step 2504, the ticket application 461 may compare the calculated and decrypted one-way hash values of the ticket beacon address 241 with the received beacon address 237 for equality.

After the ticket application 461 of the mobile device 400 compares calculated and decrypted one-way hash values of the ticket beacon address 241 to the beacon addresses 237 for equality from locked electronic tickets 108 in the local electronic tickets database 421 on the mobile device 400 and the received beacon address 237 the method 2500 may proceed to decision block 2505 and there are three possible scenarios of either zero (0), one (1), or many number (N) of matches.

If there are zero matches, then there are no redeemable electronic tickets 108 on the mobile device 400 for the current received beacon address 237 in step 2506 and the method 2500 may terminate. For this use case, the ticket application on the mobile device 400 may subsequently provide a notification to the customer user 101 that there are currently no redeemable electronic tickets 108 on their mobile device 400.

If there is one match in step 2507, then there is exactly one redeemable electronic ticket 108 on the mobile device 400 for the current received beacon address 237. For this use case, the ticket application 461 of the mobile device 400 can automatically select and present the respective electronic ticket 108 as redeemable on the mobile device 400 in step 2509 preferably without any user 101 interaction needed, thereby providing automatic ticket selection.

Otherwise there are many matches in step 2508 resulting in multiple redeemable electronic tickets 108 on the mobile device 400 for the current received beacon address 237. The ticket application 461 of the mobile device 400 subsequently presents the eligible redeemable electronic tickets 108 in step 2509 for user selection purposes in step 2510.

Figure 26:
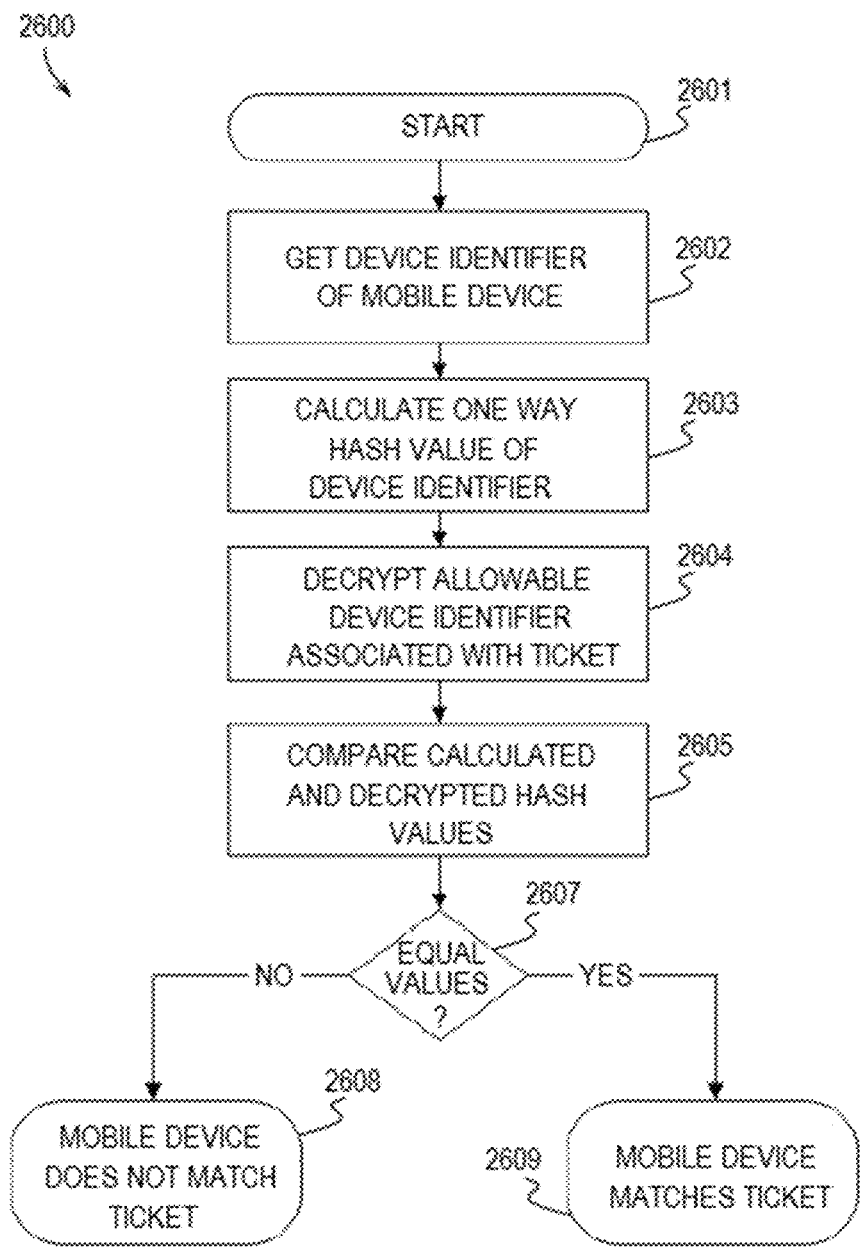
FIG. 26 shows a flowchart of an example method of verifying an electronic ticket and current mobile device identifier match according to various embodiments described herein.

FIG. 26 illustrates an example of a method for verifying that an electronic ticket 108 and current mobile device 400 identifier 234 match ("the method") 2600 as part of the offline electronic ticket verification and redemption according to various embodiments described herein. The method 2600 may be enable the use of cryptography to determine if the selected electronic ticket 108 for offline verification and redemption is redeemable on the current mobile device 400 of a user 101.

In some embodiments, the method 2600 may start 2601 and the ticket application 461 may get or obtain the device identifier 234 of the mobile device 400 that the ticket application is running on in step 2602. The ticket application may determine the device identifier 234 of its mobile device 400 preferably as was discussed in FIG. 1 for customer mobile devices 400. In step 2603 the ticket application 461 may calculate the one-way hash value of the mobile device identifier 234 by using the same cryptographic one-way hash function and encryption algorithm the system server 300 used when creating the electronic ticket 108. Next in step 2604, the ticket application 461 may decrypt the digital signature of the allowable ticket device identifier 236 associated or stored with the electronic ticket 108 in the electronic tickets database 421 of the data store 408 of the mobile device 400. The ticket application 461 may then compare the calculated and decrypted one-way hash values of the device identifier 234 to the ticket device identifier 236 for equality in step 2605. If the values are equal, the method 2600 may continue from decision block 2607 to step 2609 and the ticket application 461 may determine that the mobile device 400 matches the electronic ticket 108. If the values are not equal, the method 2600 may continue from decision block 2607 to step 2608 and the ticket application 461 may determine that the mobile device 400 does not match the electronic ticket 108. Upon completion of the method 2600 the ticket application 461 will know if the selected electronic ticket 108 is valid and/or redeemable on the current mobile device 400.

Figure 27:
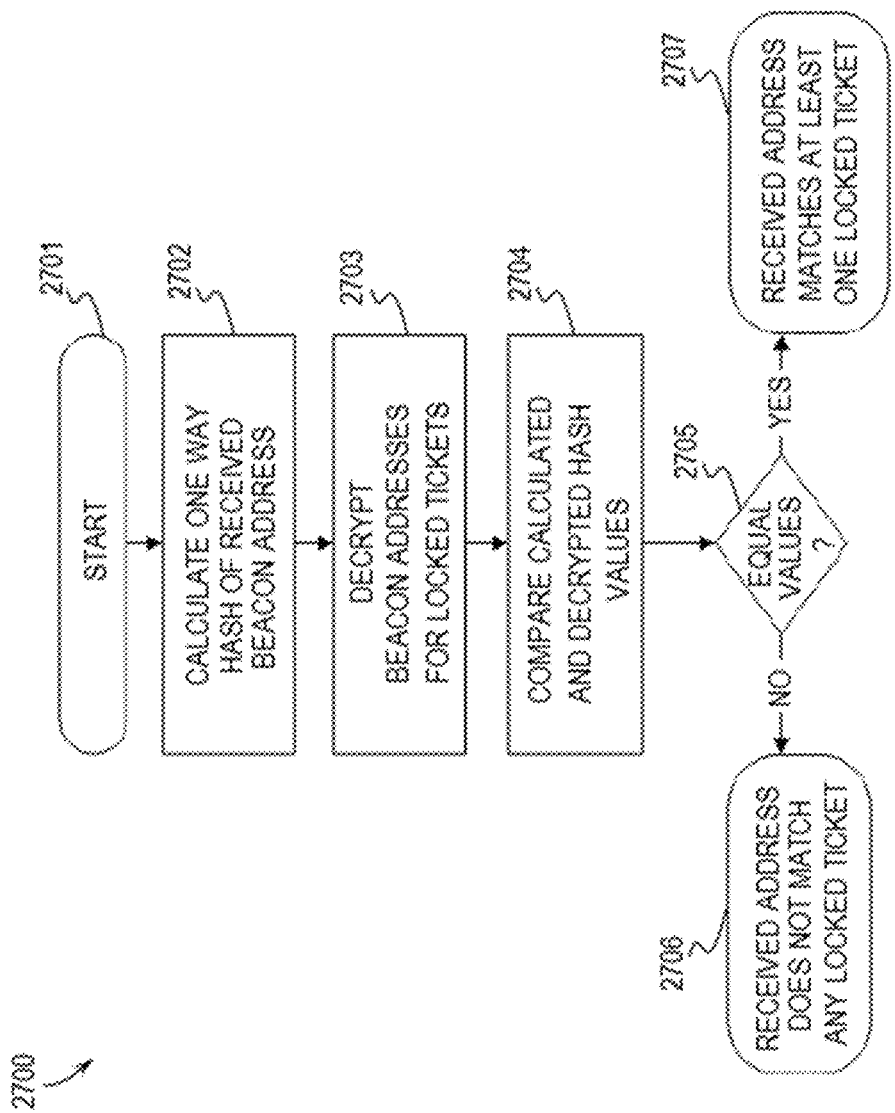
FIG. 27 illustrates a flowchart of an example method of verifying an electronic ticket and received beacon address match according to various embodiments described herein.

FIG. 27 depicts an example of a method for verifying if an electronic ticket 108 and received beacon address 237 match ("the method") 2700 as part of the offline electronic ticket verification and redemption according to various embodiments described herein. The method 2700 may enable the use of cryptography to determine if the selected electronic ticket 108 for offline verification and redemption should transition from a locked 205 to redeemable 206 status or from a redeemable 206 to redeemed 207 status on the current mobile device 400 depending on methods 2100 and 2300 for getting a redeemable 206 ticket 108 as discussed in FIG. 21 or redeem ticket as discussed in FIG. 23 respectively.

In some embodiments, the method 2700 may start 2701 and the ticket application 461 may calculate the one-way hash value of the received beacon address 237 from a beacon device 450 by using the same cryptographic one-way hash function and encryption algorithm the system server 300 used when creating the electronic ticket 108 in step 2702. Next in step 2703, the ticket application 461 may decrypt the digital signature of the allowable ticket beacon address 241 associated or stored with the electronic ticket 108 in the electronic tickets database 421 of the data store 408 of the mobile device 400. The ticket application 461 may then compare the calculated and decrypted one-way hash values of the beacon address 237 with the ticket beacon address 241 for equality in step 2704. If the values are equal, the method 2700 may continue from decision block 2705 to step 2707 and the ticket application 461 may determine that the received beacon address 237 matches at least one allowable beacon address 237 of the electronic ticket 108. If the values are not equal, the method 2700 may continue from decision block 2705 to step 2706 and the ticket application 461 may determine that the received beacon address 237 does not match at least one allowable beacon address 237 of the electronic ticket 108. Upon completion of the method 2700 the ticket application 461 will know if the selected electronic ticket 108 may transition from locked 205 to redeemable 206 status on the mobile device 400 for the get redeemable ticket method 2100 as discussed in FIG. 21 or transitions from redeemable 206 to redeemed 207 status on the mobile device 400 for the redeem ticket method 2300 as discussed in FIG. 23 respectively.

Figure 28:
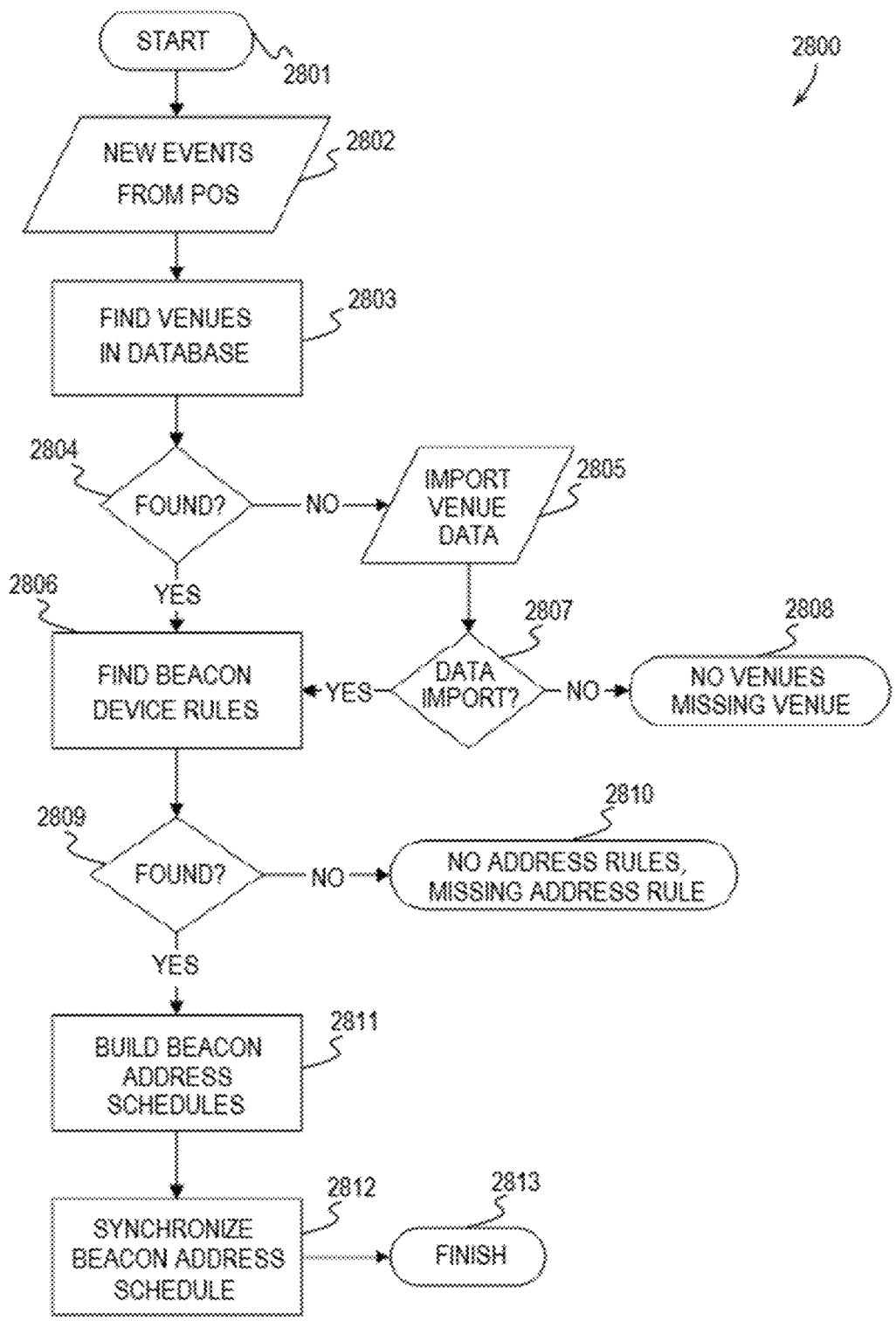
FIG. 28 depicts a flowchart of an example method of smart beacon device configuration according to various embodiments described herein.

FIG. 28 illustrates an example of a method for beacon device 450 configuration ("the method") 2800 according to various embodiments described herein. The method 2800 may be used by the system servers 300 over time to continuously receive or import new events 232 and to create one or more beacon addresses 237 and beacon address rules 240 which may be used to form a for a beacon address schedule 238 for a beacon device 450 at a venue 233 from POS systems 113 and subsequently build beacon address schedules 238 and synchronize beacon address schedules 238 to the respective beacon devices 450 physically located at the venue 233 when needed. Beacon address schedules 238 may be built from the beacon address rules 240 associated to a venue 233 whenever new events 232 are received or imported from POS systems 113. The beacon address rule 240 is therefore a business rule the system 100 uses to create new beacon address schedules 238 based on either events 232 or time. Beacon address rules 238 are configured by an external user of the system, such as an administrator user 102 (FIG. 1) who authenticates with the system back office 114 and configures what beacon address rules 240 are associated to venues 233 they are authenticated to configure through the system back office 114.

In some embodiments, the beacon address rule 240 is based on the events 232 at the venue 233. As an example, the system 100 may analyze all the start times for all events 232 on a given day, use configured before and after time spans around the event start time to calculate a time window for an event, aggregate all the calculated time windows resolving any overlapping time windows, and finally generate a new random beacon address 237 for each time window generated by the algorithm.

In further embodiments, the beacon address rule 240 is based on time. As a simple example, one configuration of this business rule is to generate a new random beacon address 237 at some configured period of time (daily, weekly, etc.) changing at some configured time of day (for example, Every Day at 12:00 AM, Every Monday at 12:00 AM, etc.).

In some embodiments, the method 2800 may start 2801 and the server 300 may receive or import new events 232 from the POS system 113 in step 2802. In step 2803, the server 300 may find venues 233 in the system database 230 based on new events in the system database 230. If venues 233 are found, the method 2800 may continue from decision block 2804 to step 2806 and the server 300 may find beacon device address rules 240 in the system database 230 for the found venues 233. If venues 233 are not found, the method 2800 may continue from decision block 2804 to step 2805 and the server 300 may import venue 233 data from the POS system 113. If venue 233 is not imported, the method 2800 may continue from decision block 2807 to step 2808 and the method 2800 may terminate due to no returned venues 233 and the missing venue 233 data.

If venue 233 is imported, the method 2800 may continue from decision block 2807 to step 2806 and then to decision block 2809. If beacon device 450 address rules 240 are not found by the server 300 in the system database 230, the method 2800 may continue from decision block 2809 to step 2810 and the method 2800 may terminate due to no returned address rules 240 and the missing address rule 240 data. If beacon device 450 address rules 240 are found by the server 300 in the system database 230, the method 2800 may continue from decision block 2809 to step 2811 and the server 300 may build one or more beacon address schedules 238 based on the found beacon device 450 address rules 240. The server 300 or other device or entity may then provide the one or more beacon address schedules 238 to the respective beacon device 450 in step 2812 and the method 2800 may finish 2812.

Figure 29:
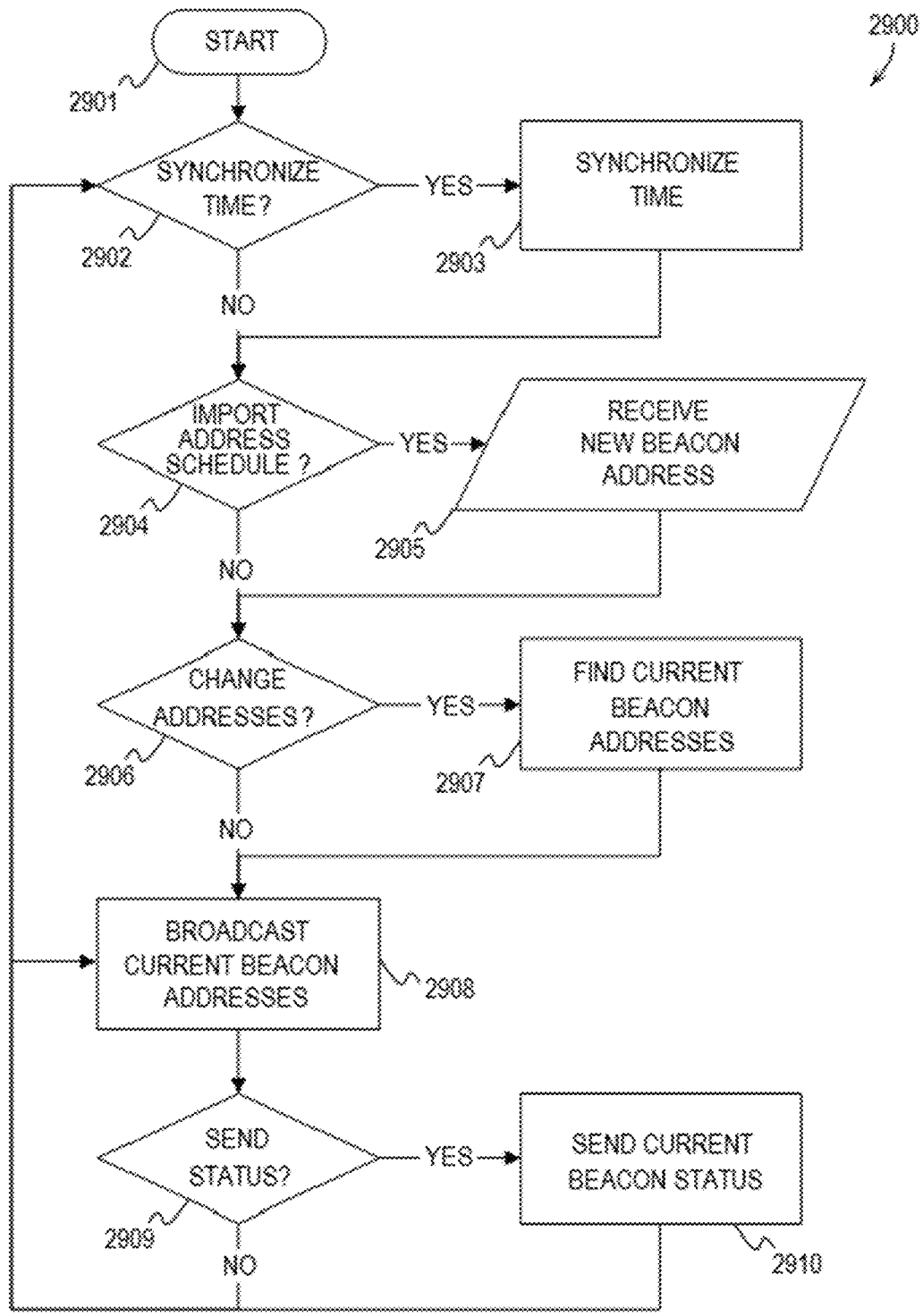
FIG. 29 shows an example of a method for beacon device runtime execution according to various embodiments described herein

FIG. 29 illustrates an example of a method for beacon device 450 runtime execution ("the method") 2900 according to various embodiments described herein. The method 2900 may be used by a beacon device 450 which broadcasts a beacon address 237 from its beacon address schedule 238 that preferably changes over time based on system generated beacon address schedules 238. A beacon device 450 preferably may change the current beacon address 237 being broadcast at specific points in time, therefore the beacon device 450 may do periodic current time and data synchronization with the system server 300 to ensure the clock run on the processor 451 is always correct. The beacon device 450 may continuously or periodically receive or import new beacon address schedules 238 from system servers 300 to keep the local beacon address schedule 238 of the beacon device 450 updated with the latest beacon address schedule 238 in the system 100 for the respective smart beacon device 450. In this manner, the beacon device 450 may be monitored by the system 100 for health and auditing purposes, and the beacon device 450 may do periodic sending of its respective status to the system server 300.

In some embodiments, the method 2900 may start 2901 and a beacon application 462 (FIG. 32) running on a beacon device 450 (FIG. 32) may determine to do a current time of the beacon device 450 synchronization in decision block 2902. This may be set to happen periodically or after events such as power loss and restoration. If the beacon application 462 is to synchronize the current time, the method 2900 may continue to step 2903 and the beacon application 462 may synchronize the current time obtained from the server 300 then continue to decision block 2904. If the beacon application 462 is not to synchronize the current time, the method 2900 may continue to decision block 2904 and the beacon application 462 may determine to do an import of beacon address schedules 238. If the beacon application 462 is to do an import of beacon address schedules 238, the method 2900 may continue to step 2905 and the beacon application 462 may receive or import one or more new beacon address schedules 238 from the server 300 then continue to decision block 2906. If the beacon application 462 is not to do an import of beacon address schedules 238, the method 2900 decision block 2906 and the beacon application 462 may determine to change the current broadcast beacon address (es) 237. If the beacon application 462 is to change the current broadcast beacon address(es) 237, the method 2900 may continue to step 2907 and the beacon application 462 may find or retrieve the current beacon addresses based on the current time and the beacon address schedule 238 then continue to step 2908. If the beacon application 462 is not to change the current broadcast beacon address(es) 237, the method 2900 may continue to step 2908 and the beacon application 462 may wirelessly broadcast the current beacon address(es) using its radio 452 and then continue to decision block 2909 at which the beacon application 462 determine if it is to send beacon device 450 status information to the server 300. This may be set to happen periodically or after events such as power loss and restoration. If the beacon application 462 is to send beacon device 450 status information to the server 300, the method 2900 may continue to step 2910 and the beacon application 462 may beacon device 450 status information to the server 300 then continue to step 2908 or to decision block 2902. If the beacon application 462 is to send beacon device 450 status information to the server 300, the method 2900 may also then continue to step 2908 or to decision block 2902.

Figure 30:
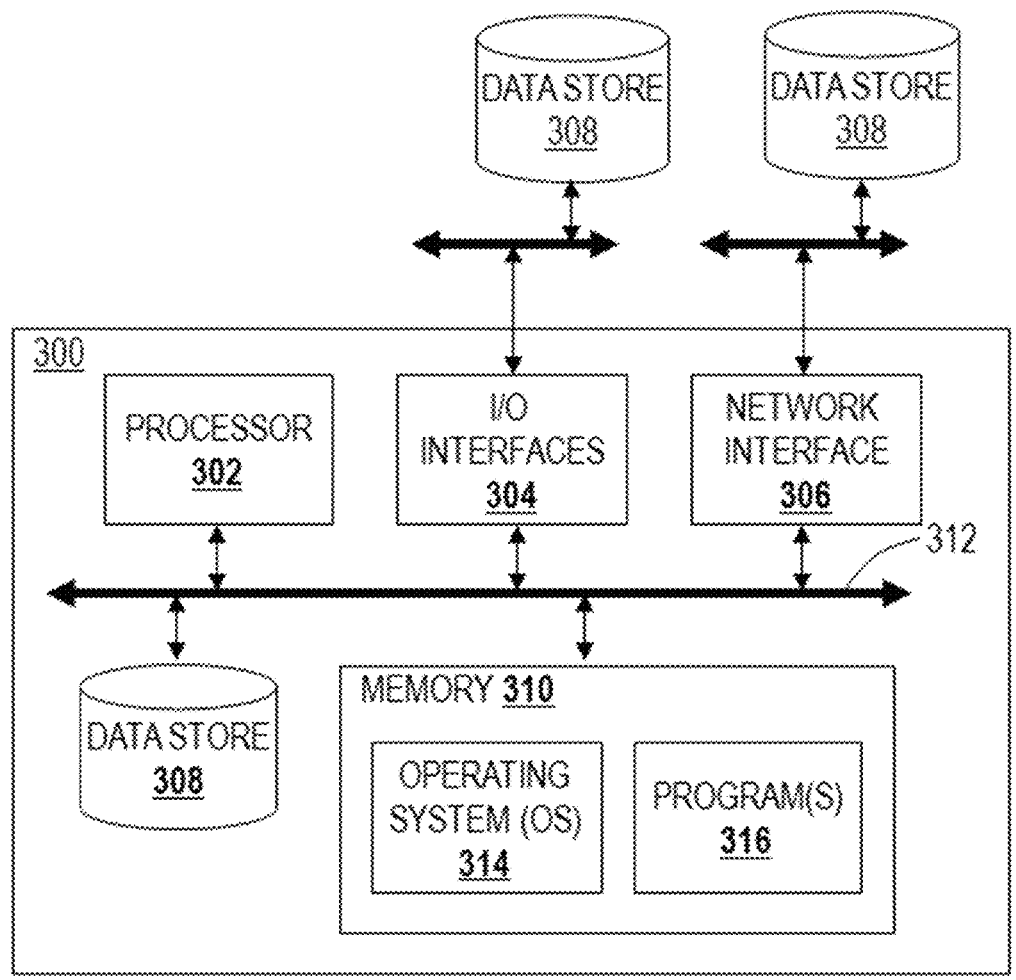
FIG. 30 illustrates an example of a block diagram of a server which may be used in the system or standalone according to various embodiments described herein.

Referring now to FIG. 30, in an exemplary embodiment, a block diagram illustrates a server 300 of which one or more may be used in the system 100 or standalone. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 30 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 320 may be configured to implement the various processes, algorithms, methods, techniques, etc. described herein.

Figure 31:
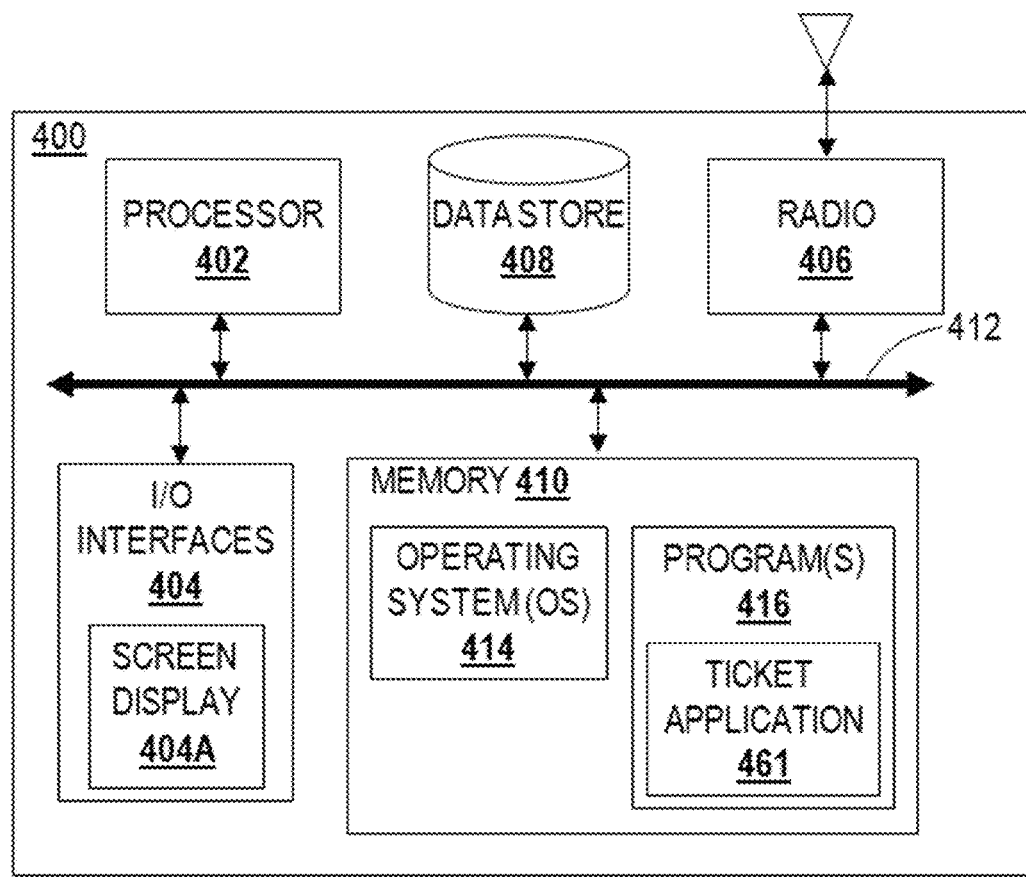
FIG. 31 depicts an example of a block diagram of a mobile device according to various embodiments described herein.

Referring to FIG. 31, in an exemplary embodiment, a block diagram illustrates a mobile device 400 of which one or more may be used in the system 100 or the like by a user 101. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 31 depicts the mobile device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display device such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the user device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 31, the software in the memory system 410 includes a suitable operating system (O/S) 414 and programs 416 which may include a ticket application 461.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like. The programs 420 may include a ticket application 461 which may optionally be downloaded to the mobile device 400 and various applications, add-ons, etc. configured to be operated by the processor 402 to provide end user functionality with the user device 400. Exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network 105 to manipulate information of the system 100.

Figure 32:
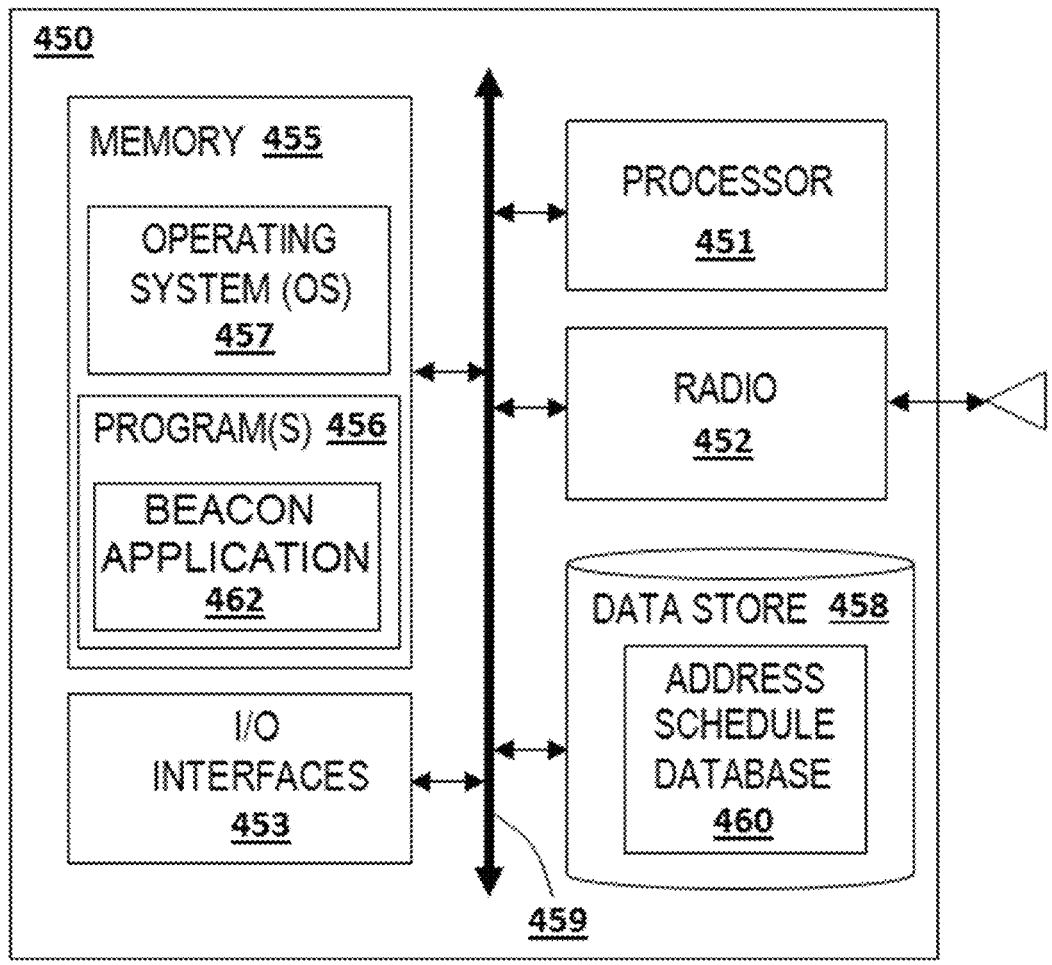
FIG. 32 shows an example of a block diagram of a beacon device according to various embodiments described herein.

FIG. 32 shows a block diagram of some components of a beacon device 450 of which one or more may be used in the system 100 or the like. The beacon device 450 can be a digital device that, in terms of hardware architecture, generally includes a processor 451, input/output (I/O) interfaces 453, a radio 452, a data store 458, and memory 455. It should be appreciated by those of ordinary skill in the art that FIG. 32 depicts the beacon device 450 in an oversimplified manner, and a practical embodiment may include additional components and suitably configured processing logic to support known or conventional operating features that are not described in detail herein. The components (451, 452, 453, 458, and 455) are communicatively coupled via a local interface 459.

The local interface 459 can be, for example but not limited to, one or more buses or other wired or wireless connections, as is known in the art. The local interface 459 can have additional elements, which are omitted for simplicity, such as controllers, buffers (caches), drivers, repeaters, and receivers, among many others, to enable communications. Further, the local interface 459 may include address, control, and/or data connections to enable appropriate communications among the aforementioned components.

The processor 451 is a hardware device for executing software instructions. The processor 451 can be any custom made or commercially available processor, a central processing unit (CPU), an auxiliary processor among several processors associated with the beacon device 450, a semiconductor-based microprocessor (in the form of a microchip or chip set), or generally any device for executing software instructions. When the beacon device 450 is in operation, the processor 451 is configured to execute software stored within the memory 455, to communicate data to and from the memory 455, and to generally control operations of the beacon device 450 pursuant to the software instructions. In an exemplary embodiment, the processor 451 may include a mobile optimized processor such as optimized for power consumption and mobile applications.

The I/O interfaces 453 can be used to receive data and user input and/or for providing system output. User input can be provided via a plurality of I/O interfaces 453, such as a keypad, a touch screen, a camera, a microphone, a scroll ball, a scroll bar, buttons, bar code scanner, voice recognition, eye gesture, and the like. System output can be provided via a display device such as a liquid crystal display (LCD), touch screen, and the like. The I/O interfaces 453 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 453 can include a graphical user interface (GUI) that enables a user to interact with the beacon device 450.

The radio 452 enables wireless communication to an external access device or network. Any number of suitable wireless data communication protocols, techniques, or methodologies can be supported by the radio 452, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 458 may be used to store data. The data store 458 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 458 may incorporate electronic, magnetic, optical, and/or other types of storage media.

The memory 455 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 455 may incorporate electronic, magnetic, optical, and/or other types of storage media. Note that the memory 455 may have a distributed architecture, where various components are situated remotely from one another, but can be accessed by the processor 451. The software in memory 455 can include one or more software programs, each of which includes an ordered listing of executable instructions for implementing logical functions. In the example of FIG. 32, the software in the memory system 455 includes a suitable operating system (O/S) 457 and programs 456 which include a beacon application 462.

The operating system 457 essentially controls the execution of other computer programs, and provides scheduling, input-output control, file and data management, memory management, and communication control and related services. The operating system 457 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like. The programs 456 may include a beacon application 462 and various applications, add-ons, etc. configured to provide end user functionality with the beacon device 450.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or wifi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a user device or client device such as a personal digital assistant (PDA), laptop computer, tablet computer, smartphone, or cellular telephone. The LAN communications network and the other communications networks such as cellular wireless and wifi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An electronic ticket verification system, the system comprising:
   a beacon device having a beacon radio, wherein the beacon radio broadcasts a first beacon address during a first time dependent window and a second beacon address during a second time dependent window; the first beacon address being distinct from the second beacon address;
   a dynamic beacon schedule, the dynamic beacon schedule configured to instruct the beacon radio to broadcast the first beacon address only during the first time dependent window and the second beacon address only during the second time dependent window;
   a mobile device having a screen display, a data store, a processor, and a mobile device radio;
   an electronic ticket stored within the data store of the mobile device wherein the electronic ticket is associated with a ticket beacon address; and
   wherein the mobile device radio receives the first beacon address from the beacon radio during the first time dependent window and the processor of the mobile device compares the received first beacon address to the ticket beacon address to determine if the electronic ticket is redeemable.

2. The system of claim 1, wherein the processor of the mobile device changes a graphical depiction of the electronic ticket on the screen display from a redeemable state to a redeemed state when the mobile device radio no longer receives the first beacon address from the beacon device.

3. The system of claim 2, wherein the screen display of the mobile device is a touch screen display for receiving touch input, and wherein the processor of the mobile device changes the graphical depiction of the electronic ticket on the screen display from the redeemable state to the redeemed state when touch input is received by the touch screen display.

4. The system of claim 1, further comprising a server, wherein the server transmits the dynamic beacon schedule to the beacon device and wherein the dynamic beacon schedule is unique to a first venue and wherein a second dynamic beacon schedule is transmitted to a second beacon device and the second dynamic beacon schedule is unique to a second venue.

5. The system of claim 4, wherein the server periodically changes the dynamic beacon schedule provided to the beacon device so that the first beacon address is not a static address.

6. The system of claim 1, wherein the electronic ticket includes a graphical depiction of the electronic ticket in a locked state as a default and initial state of the electronic ticket, the graphical depiction of the electronic ticket in the locked state configured to be displayed on the screen display of the mobile device.

7. The system of claim 6, wherein the electronic ticket includes a ticket device identifier, wherein the mobile device has a mobile device identifier, and wherein the processor of the mobile device is unable to change the electronic ticket from the locked state to a different state if the ticket device identifier does not match the mobile device identifier.

8. The system of claim 7, wherein the electronic ticket device identifier is a cryptographic one-way hash value, wherein the processor of the mobile device computes the cryptographic one-way hash value of the mobile device identifier, and wherein the processor is unable to change the electronic ticket from the locked state to a different state if the ticket device identifier cryptographic one-way hash value does not match the mobile device identifier cryptographic one-way hash value.

9. The system of claim 6, wherein the processor of the mobile device is unable to change the electronic ticket from the locked state to a different state if the first ticket beacon address of the electronic ticket does not match the first beacon address broadcast by the beacon device.

10. The system of claim 9, wherein the first ticket beacon address is a cryptographic one-way hash value, wherein the processor of the mobile device computes the cryptographic one-way hash value of the first beacon address broadcast by the beacon device, and wherein the processor of the mobile device is unable to change the electronic ticket from the locked state to a different state if the ticket beacon address cryptographic one-way hash value does not match the cryptographic one-way hash value of the first beacon address broadcast by the beacon device.

11. An electronic ticket verification system, the system comprising:
a first beacon device having a first beacon radio, wherein the first beacon radio broadcasts a first beacon address during a first time dependent window;
a first dynamic beacon schedule, the first dynamic beacon schedule configured to instruct the first beacon radio to broadcast the first beacon address only during the first time dependent window;
a second beacon device having a second beacon radio, wherein the second beacon radio broadcasts a second beacon address during the same first time dependent window;
a second dynamic beacon schedule, the second dynamic beacon schedule configured to instruct the second beacon radio to broadcast a second beacon address during the first time dependent window, the first beacon address and the second beacon address being distinct from each other;
a mobile device having a screen display, a data store, a processor, and a mobile device radio;
an electronic ticket stored within the data store of the mobile device, wherein the electronic ticket is associated with a first ticket beacon address and a second ticket beacon address;
wherein the mobile device radio receives the first beacon address from the first beacon and the processor of the mobile device compares the first beacon address to the first ticket beacon address and changes the electronic ticket from a first state to a second state, and
wherein then the mobile device radio further receives the second beacon address from the second beacon device and the processor of the mobile device compares the second beacon address to the second ticket beacon address and changes the electronic ticket from the second state to a third state.

12. The system of claim 11, further comprising a server, wherein the server transmits the first dynamic beacon schedule to the first beacon device and the second dynamic beacon schedule to the second beacon device, and wherein the first dynamic beacon schedule and the second dynamic beacon schedule are both unique to each other.

13. The system of claim 12, wherein the server periodically changes the first dynamic beacon schedule provided to the first beacon device and periodically changes the second dynamic beacon schedule provided to the second beacon device.

14. The system of claim 11, wherein the electronic ticket includes a graphical depiction of the electronic ticket in a locked state as a default first state of the electronic ticket, the graphical depiction of the electronic ticket in the locked state configured to be displayed on the screen display of the mobile device.

15. The system of claim 14, wherein the electronic ticket includes a ticket device identifier, wherein the mobile device has a mobile device identifier, and wherein the processor is unable to change the electronic ticket from the default locked state to the second state if the ticket device identifier does not match the mobile device identifier.

16. The system of claim 15, wherein the electronic ticket device identifier is a cryptographic one-way hash value, wherein the processor of the mobile device computes the cryptographic one-way hash value of the mobile device identifier, and wherein the processor is unable to change the electronic ticket from the locked state to the second state if the ticket device identifier cryptographic one-way hash value does not match the mobile device identifier cryptographic one-way hash value.

17. The system of claim 14, wherein the processor of the mobile is unable to change the electronic ticket from the locked state to the second state if the first ticket beacon address of the electronic ticket does not match the first beacon address broadcast by the first beacon device.

18. The system of claim 17, wherein the first ticket beacon address is a cryptographic one-way hash value, wherein the processor of the mobile device computes the cryptographic one-way hash value of the first beacon address broadcast by the first beacon device, and wherein the processor of the mobile device is unable to change the electronic ticket from the locked state to the second state if the first ticket beacon address cryptographic one-way hash value does not match the cryptographic one-way hash value of the first beacon address broadcast by the first beacon device.

* * * * *